Figure 1:
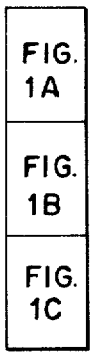
Figure 1A:
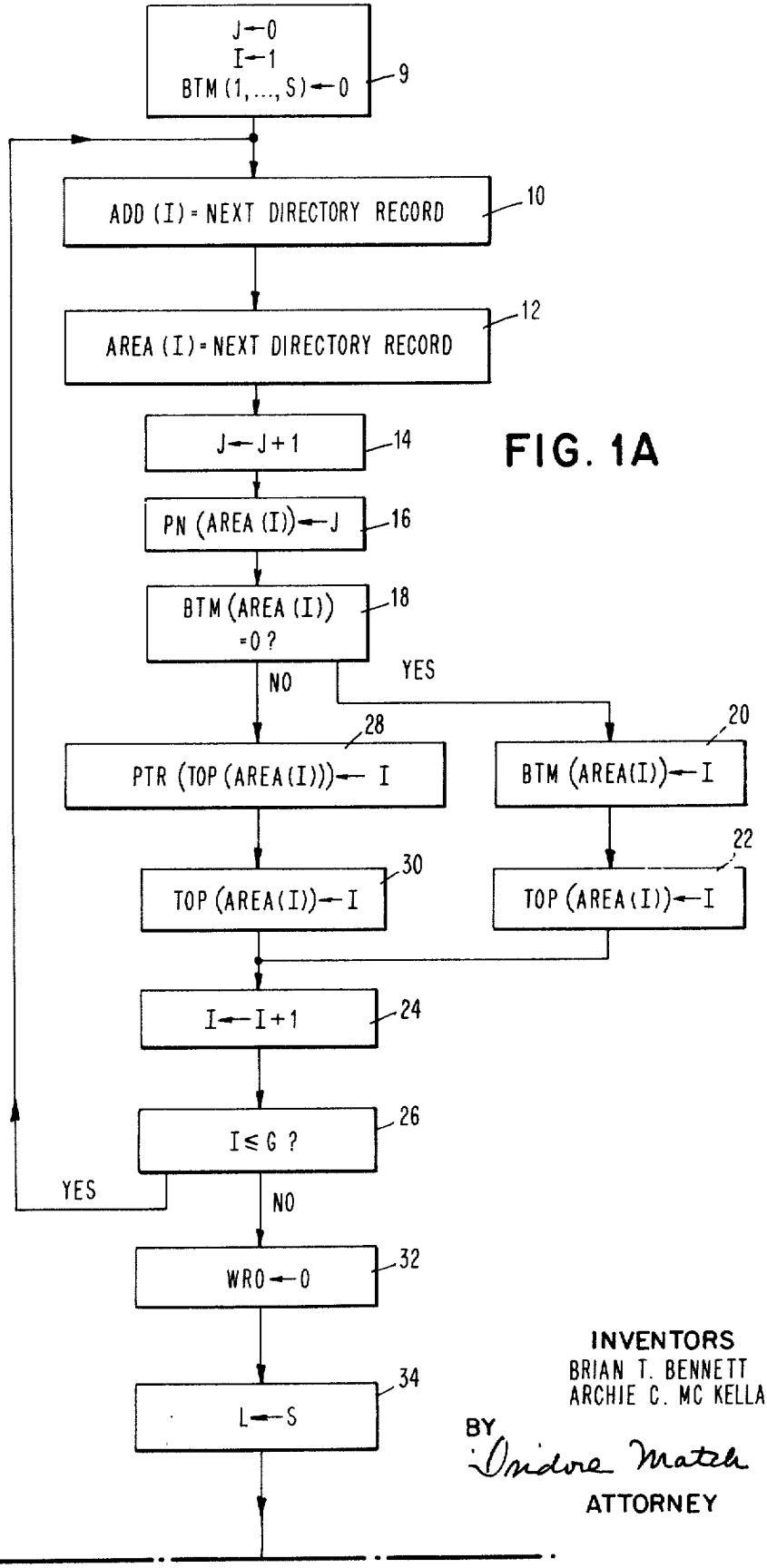
Figure 1B:
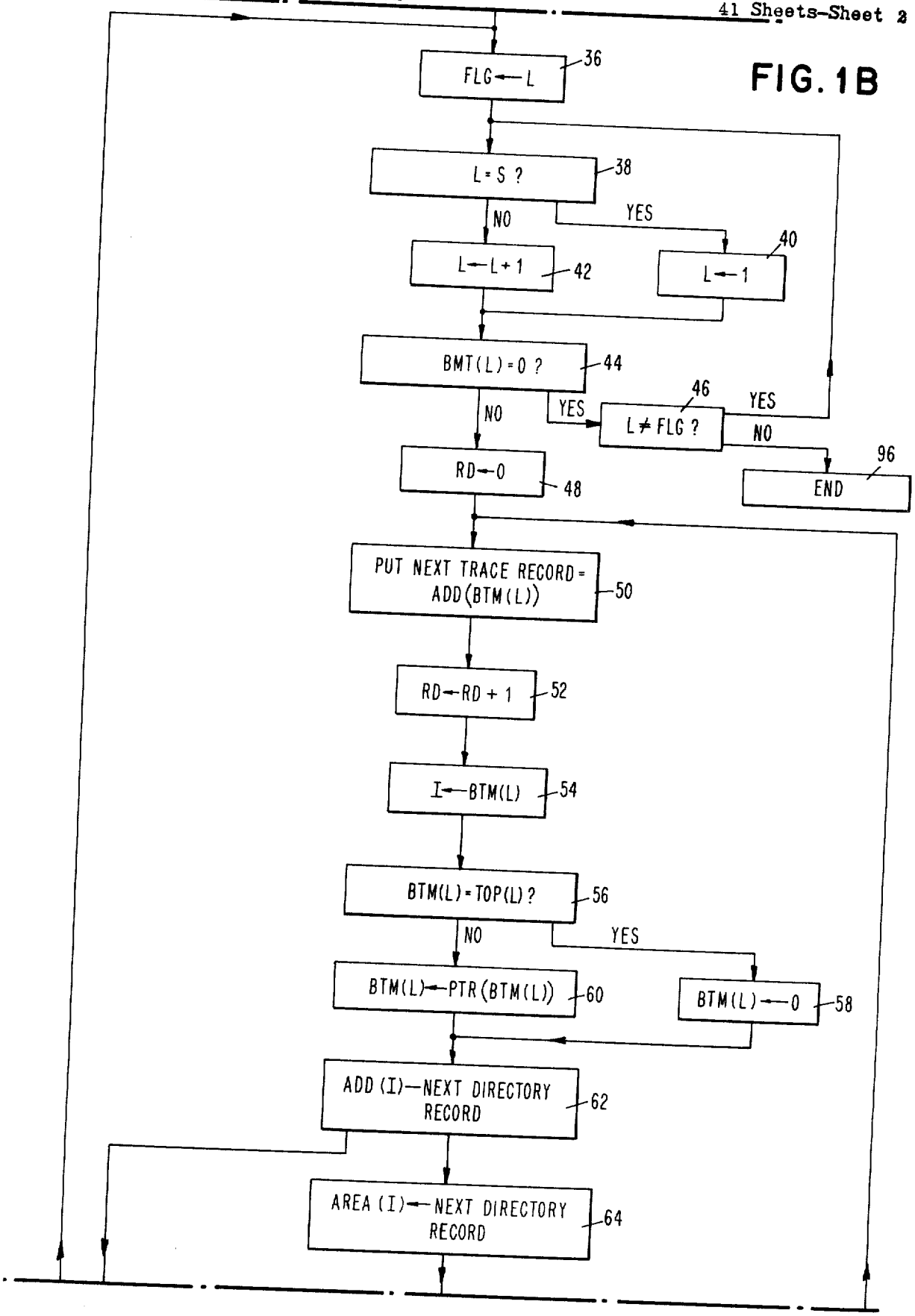
Figure 1C:
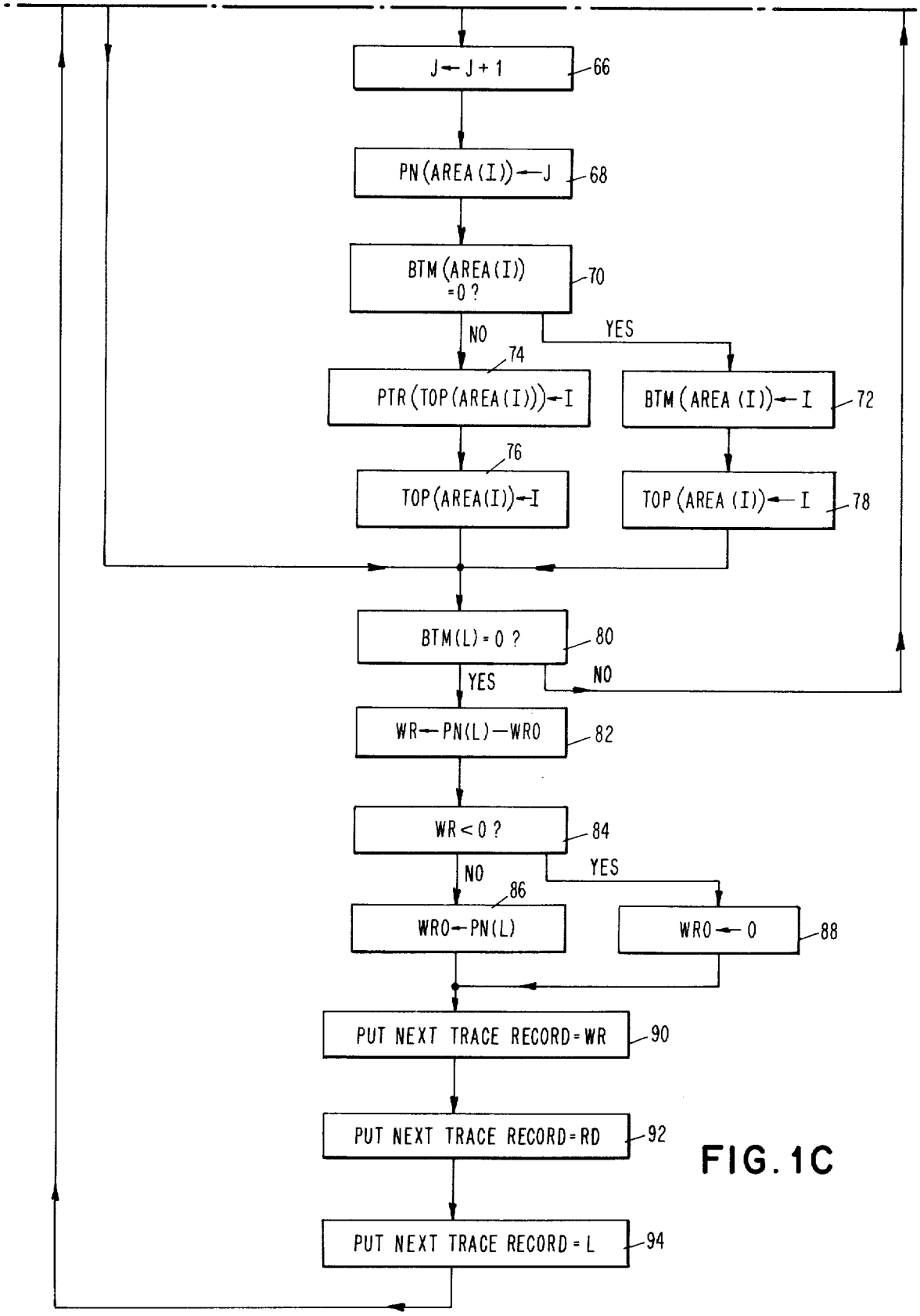
Figure 4I:
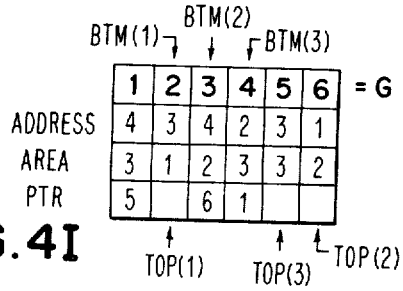
Figure 4N:
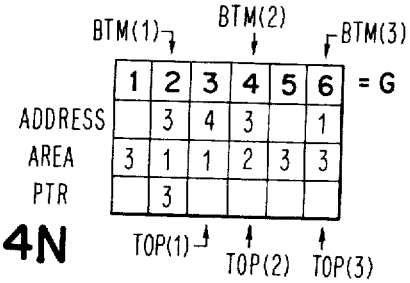
Figure 4J:
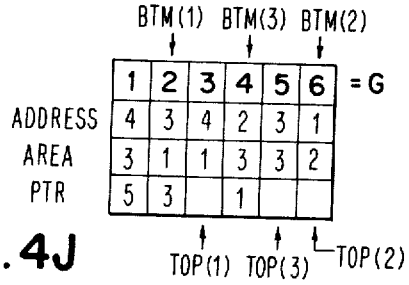
Figure 4O:
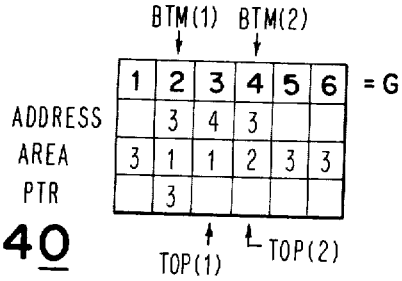
Figure 4K:
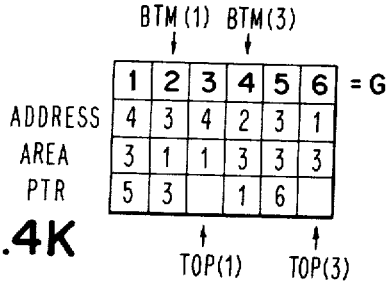
Figure 4P:
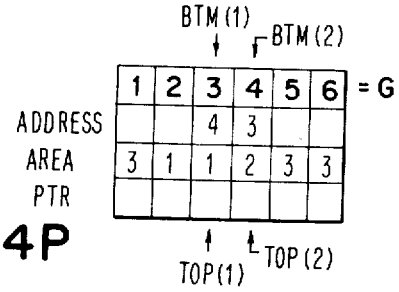
Figure 4L:
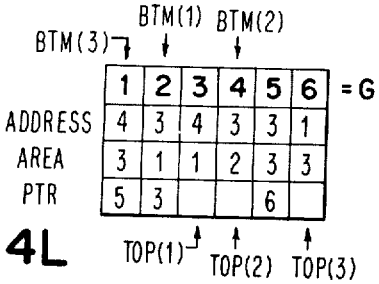
Figure 4Q:
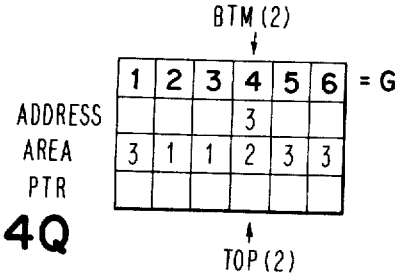
Figure 4M:
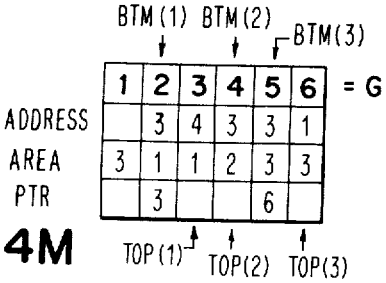
Figure 4R:
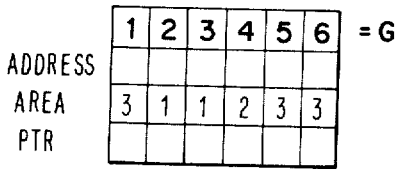
Figures 16, 16A, 16B:
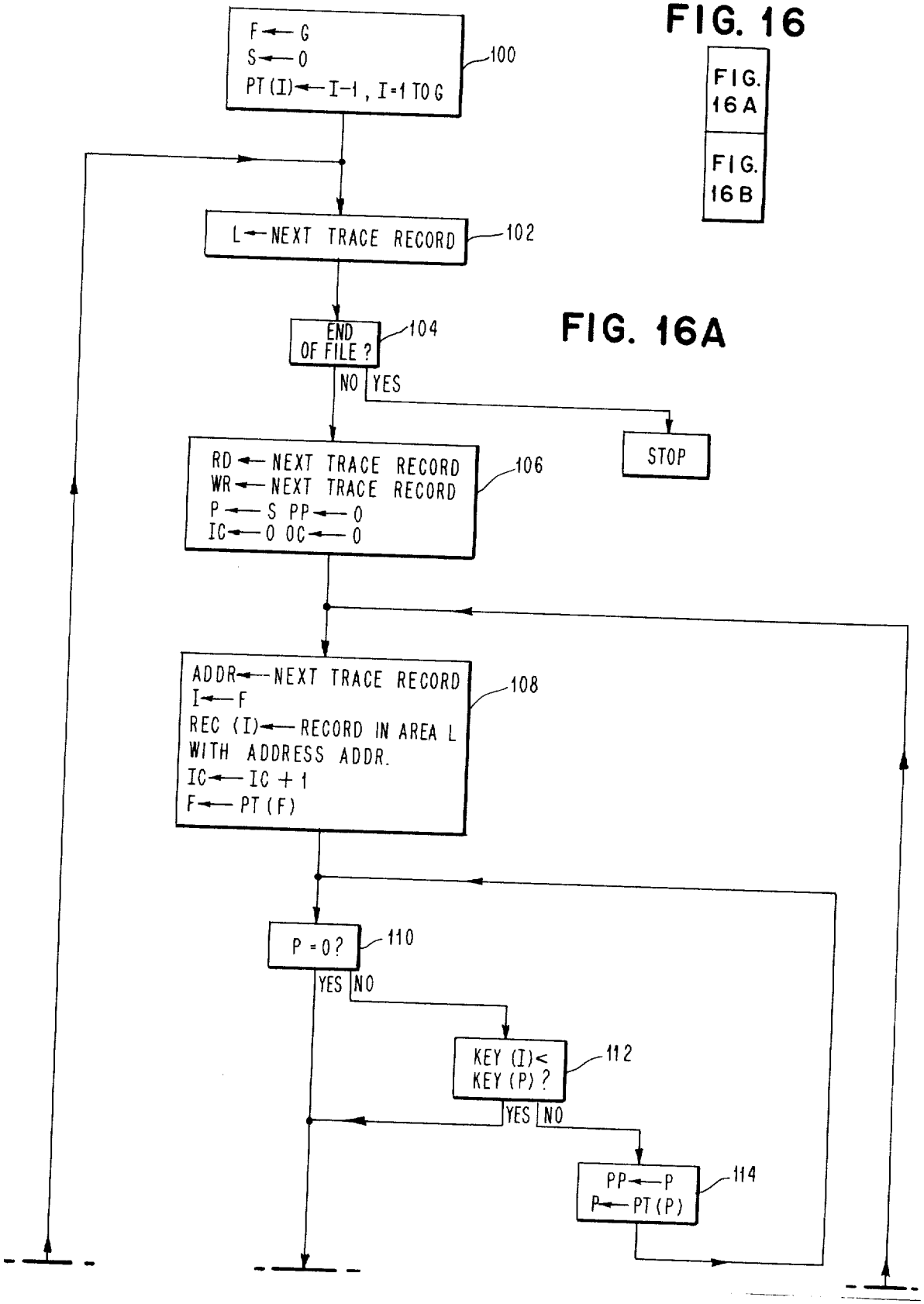
Figure 16B:
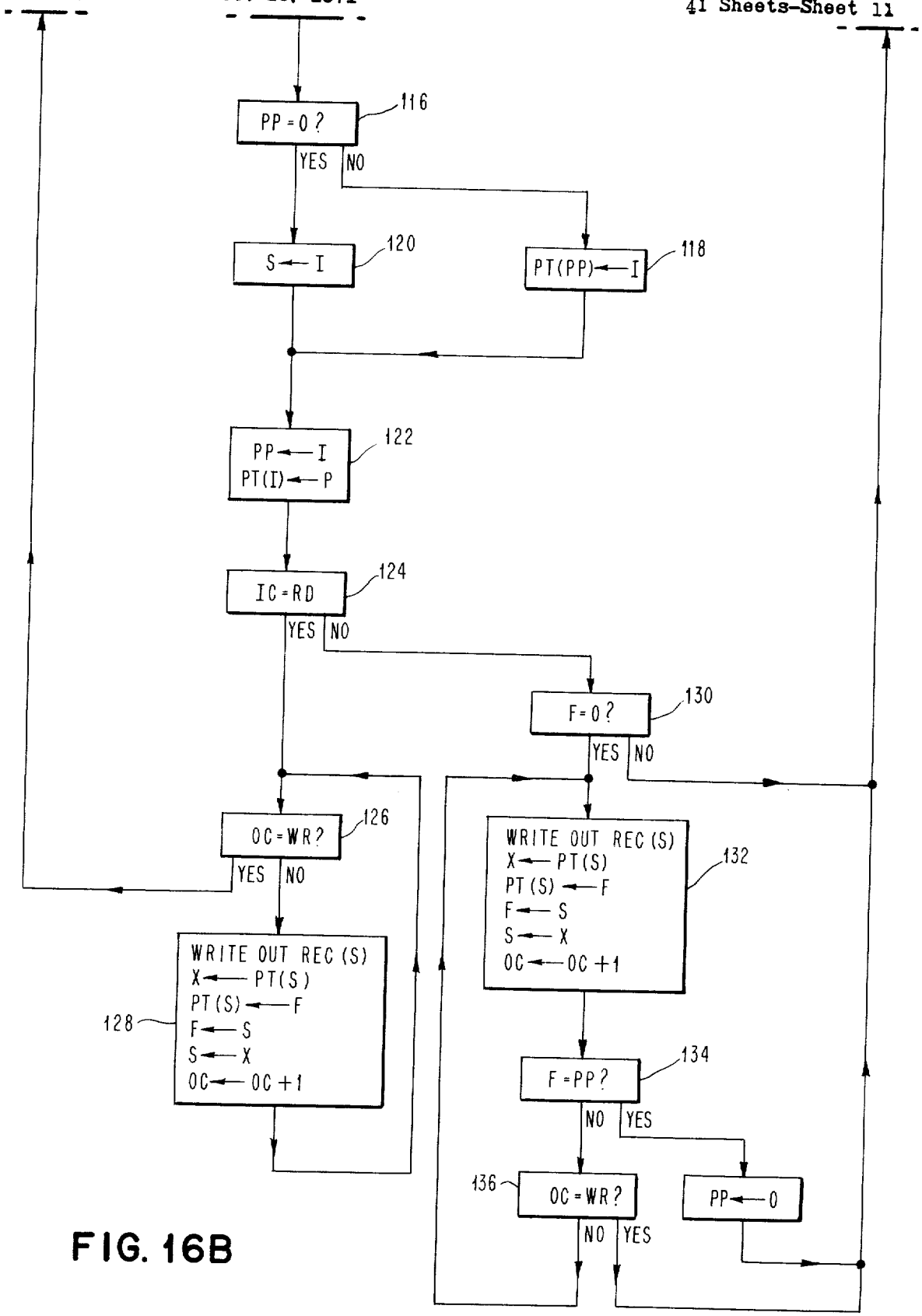
Figure 31:
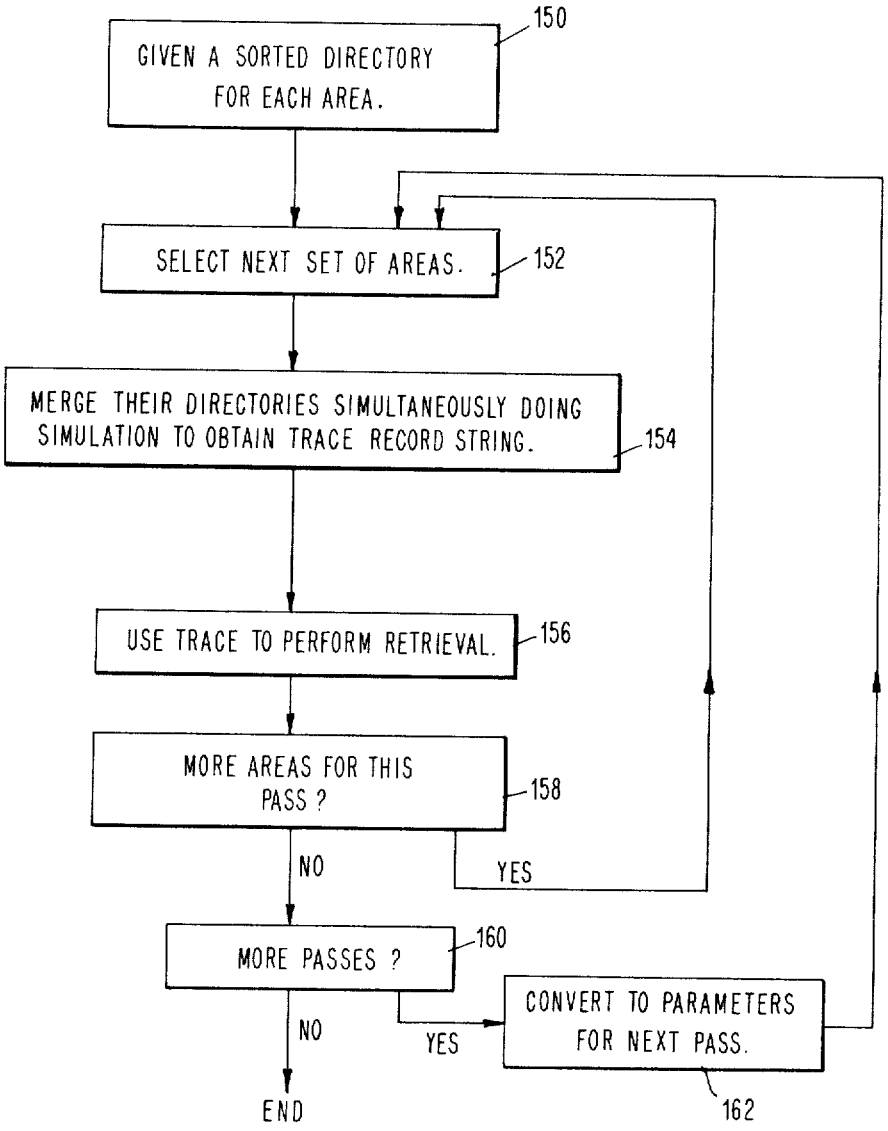
Figure 32:
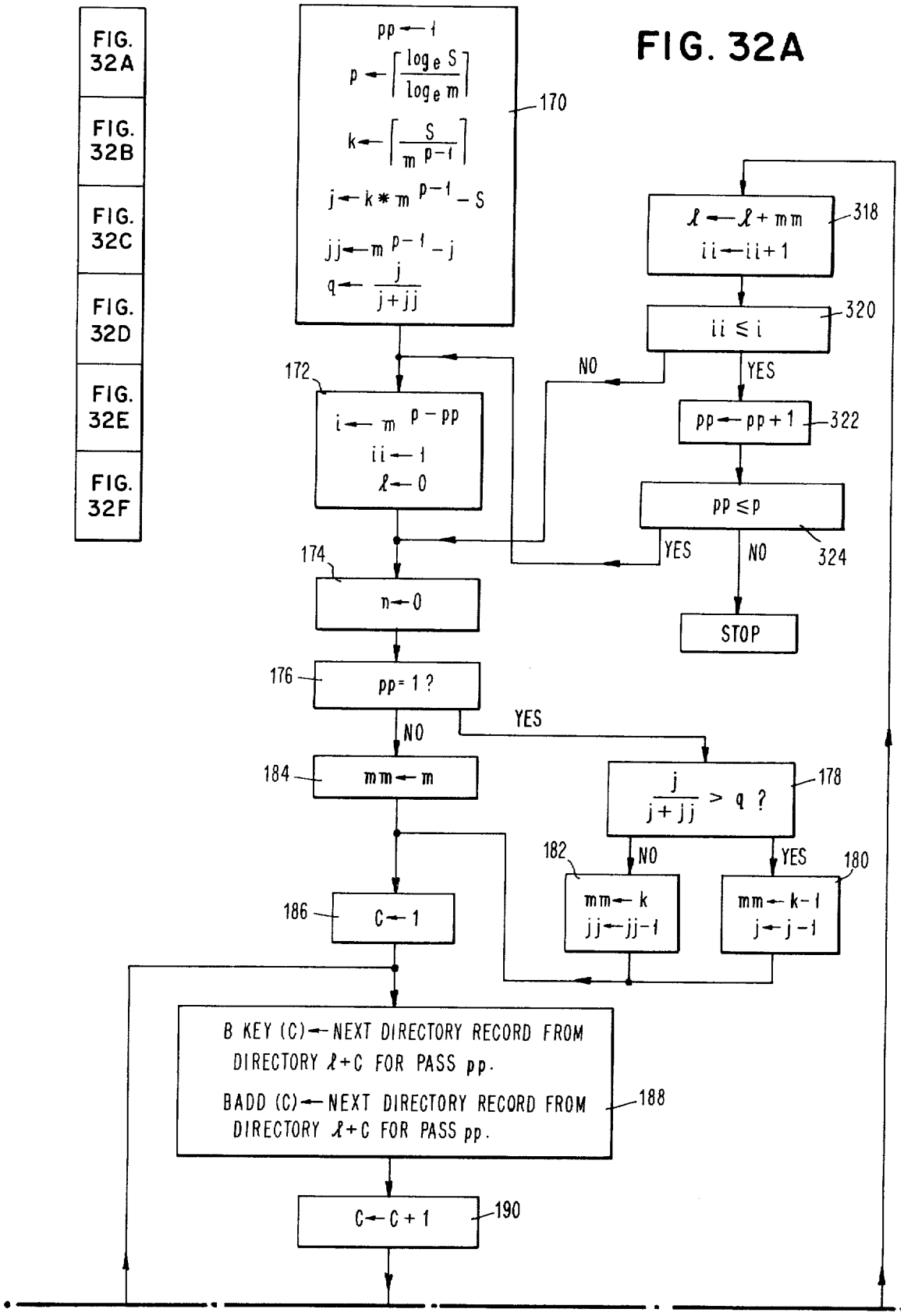
Figure 32B:
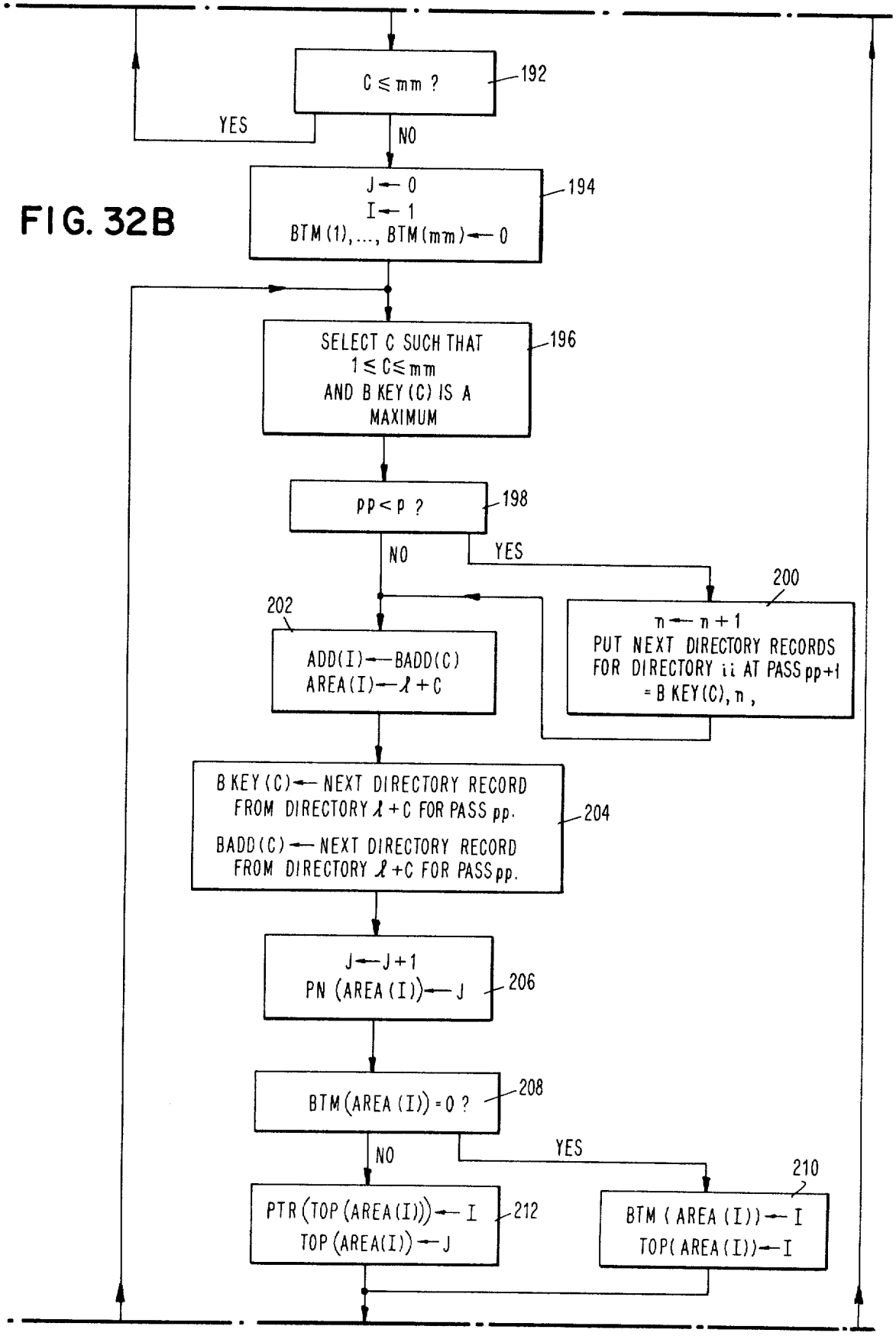
Figure 32C:
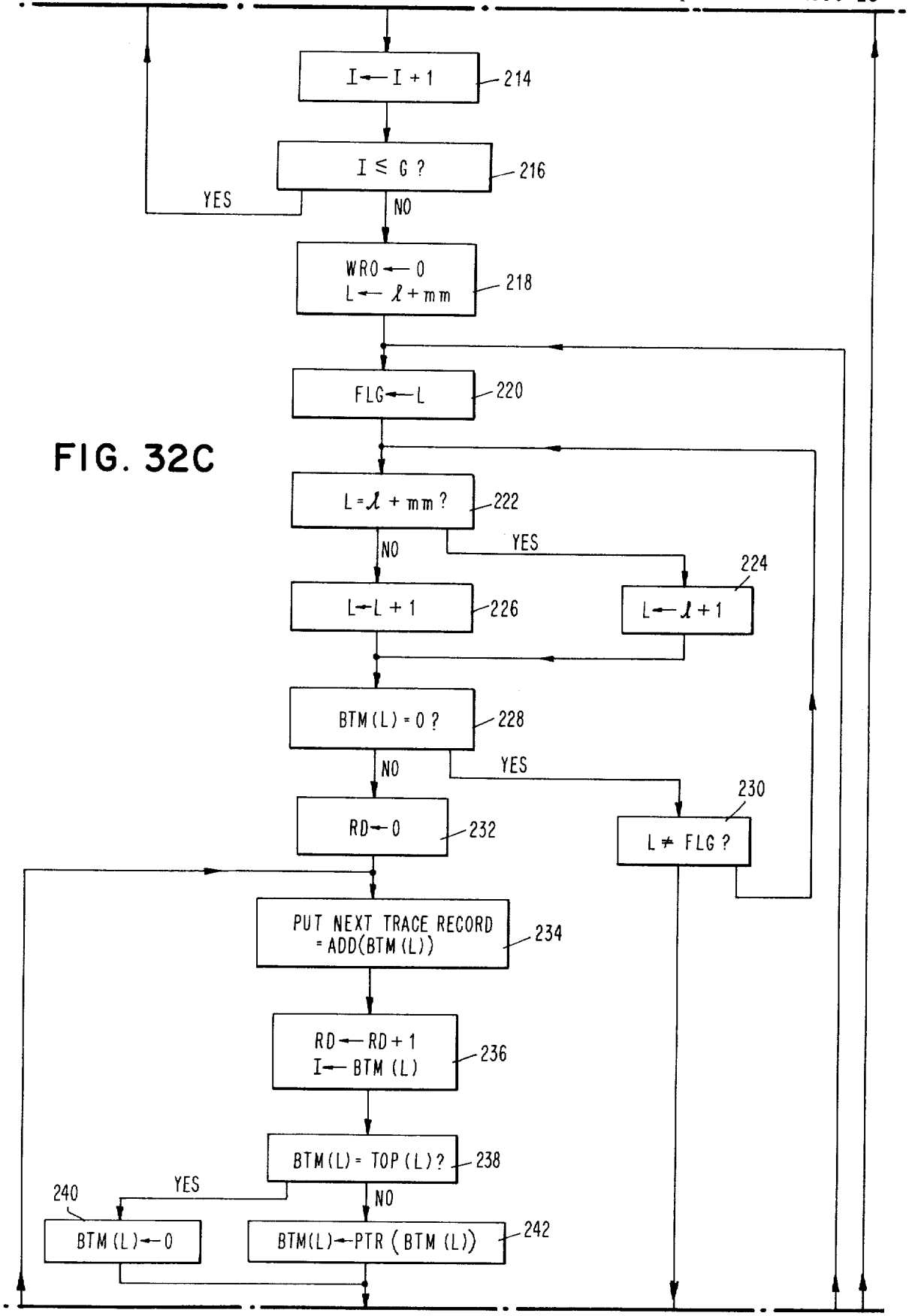
Figure 32D:
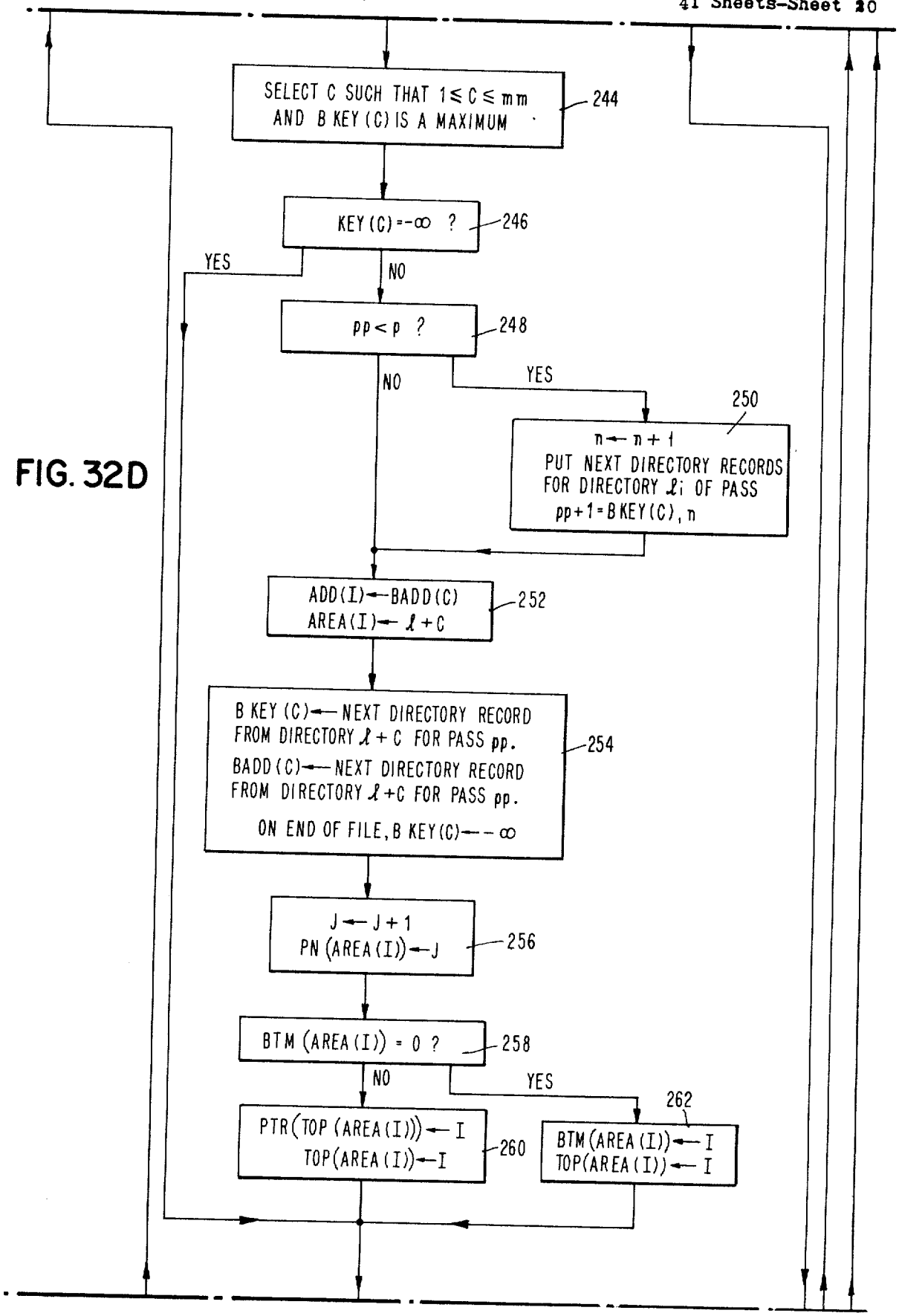
Figure 32E:
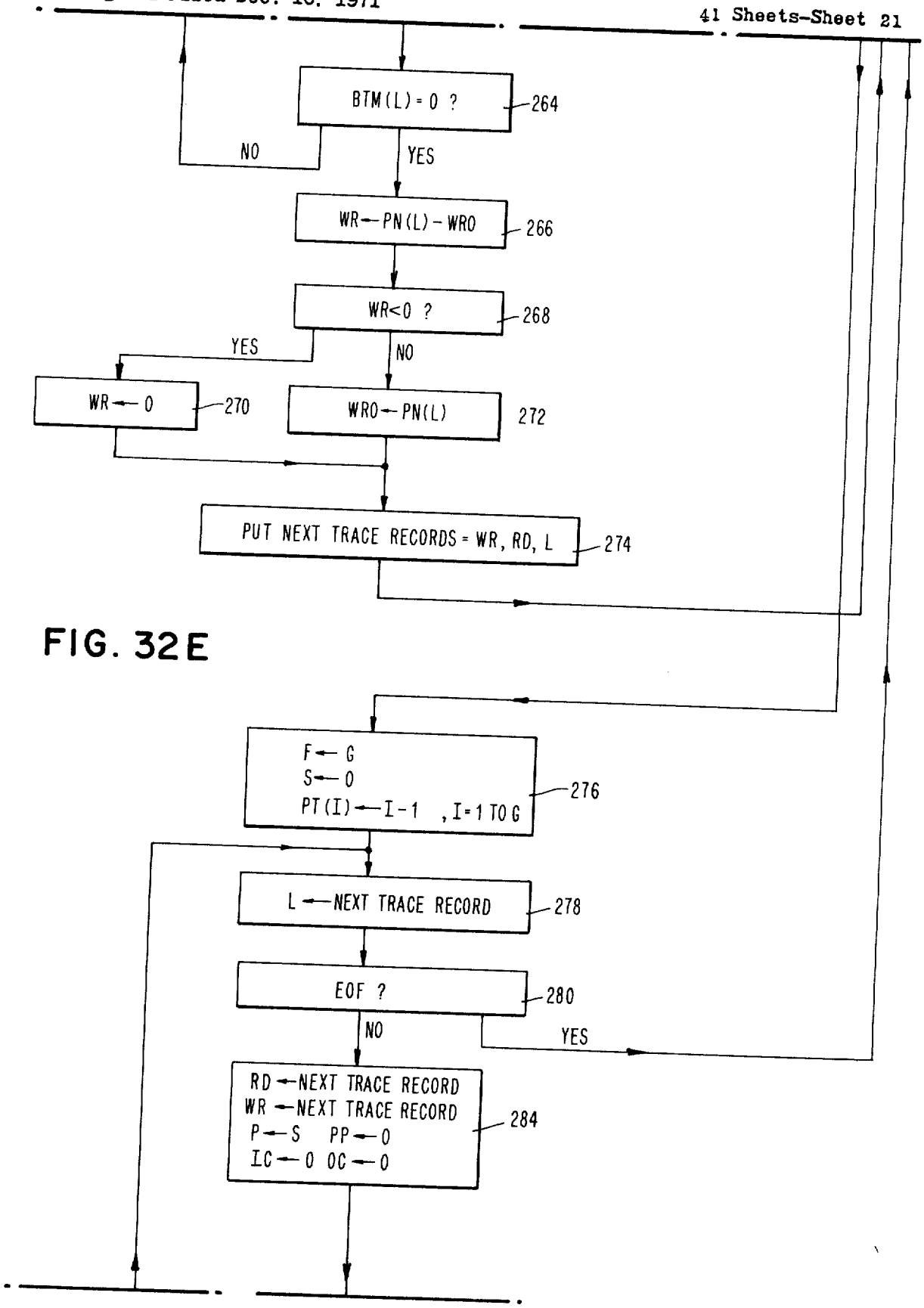
Figure 32F:
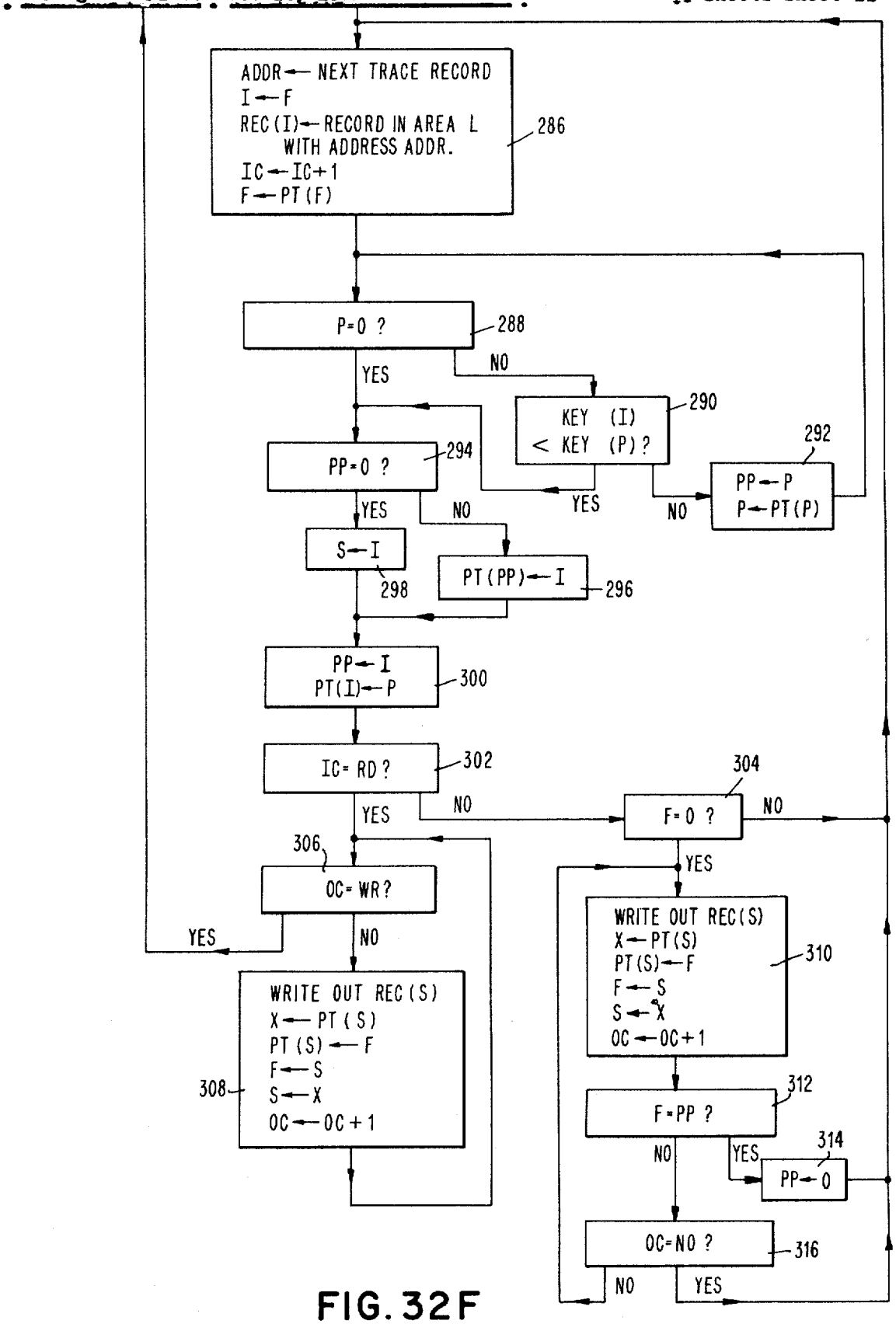
Figures 35, 35A:
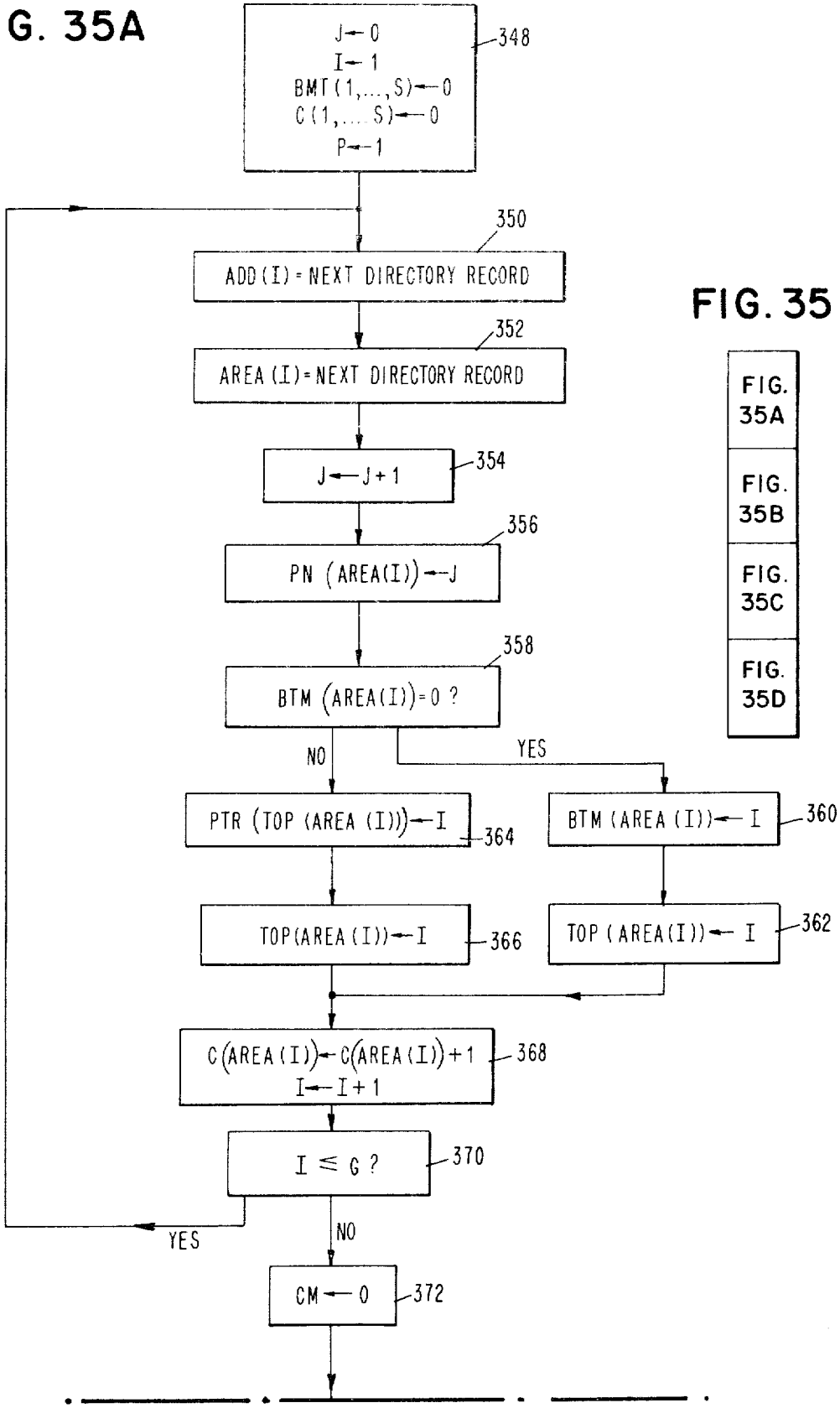
Figure 35B:
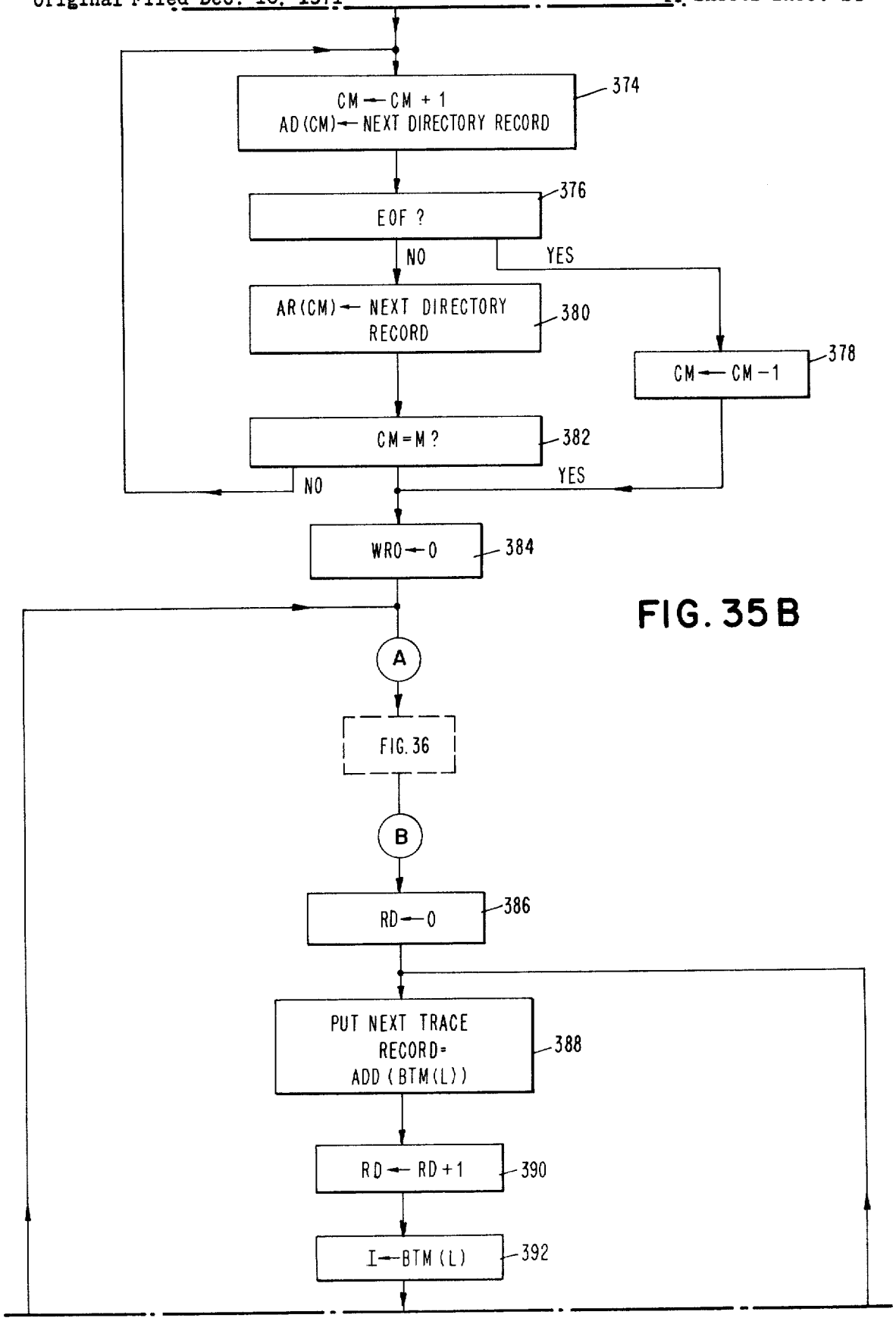
Figure 35C:
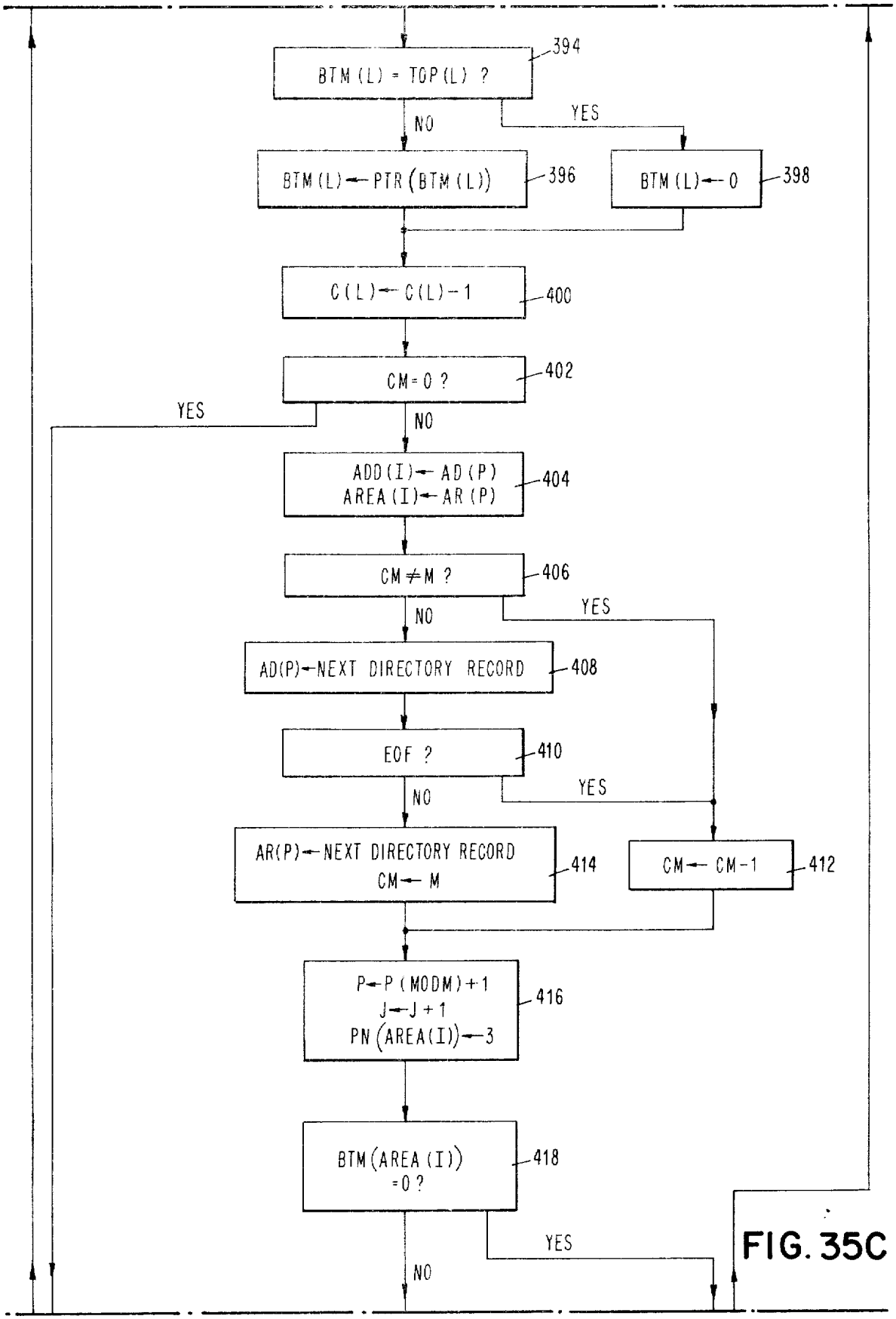
Figure 35D:
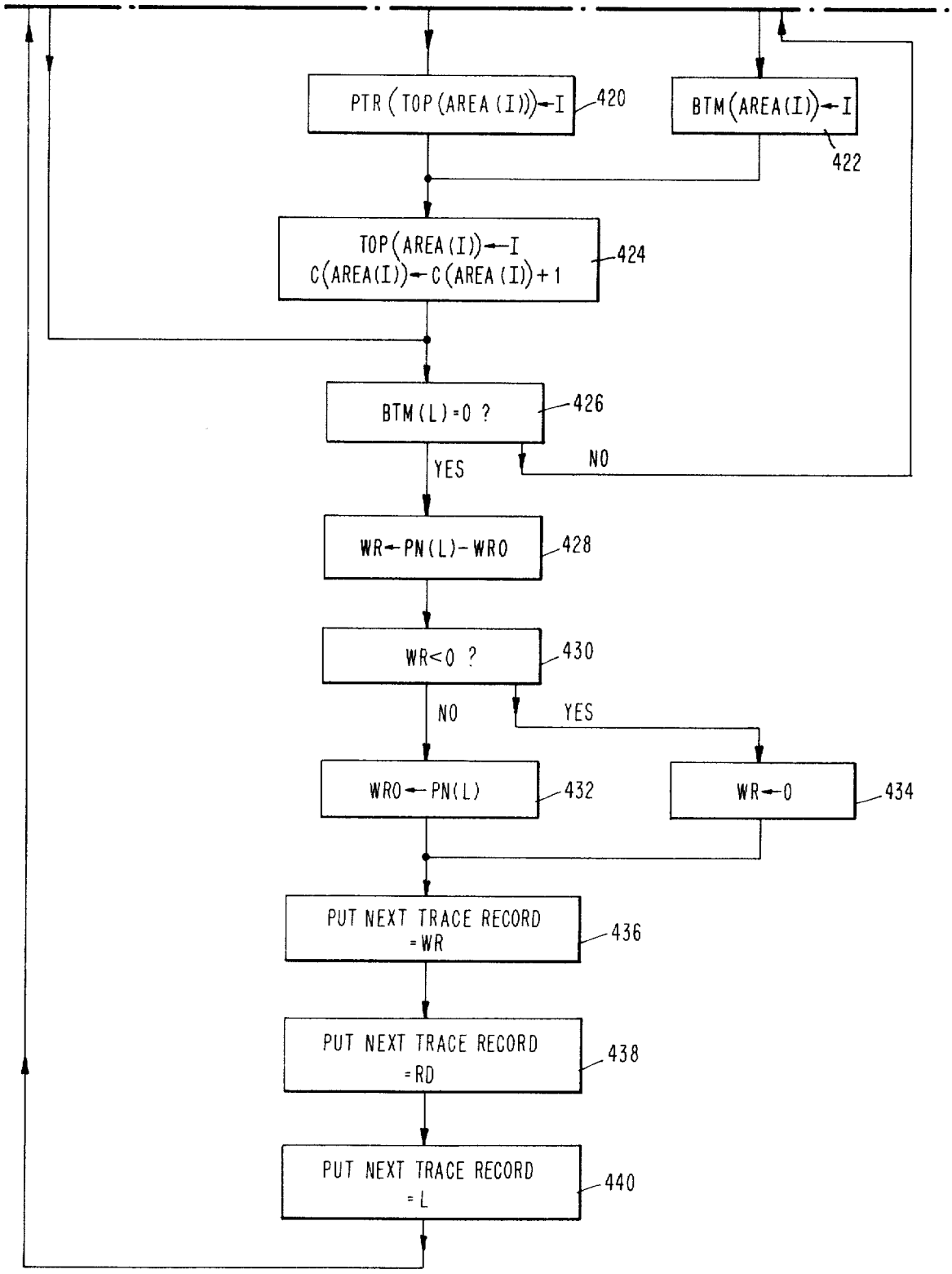
Figures 36, 36A:
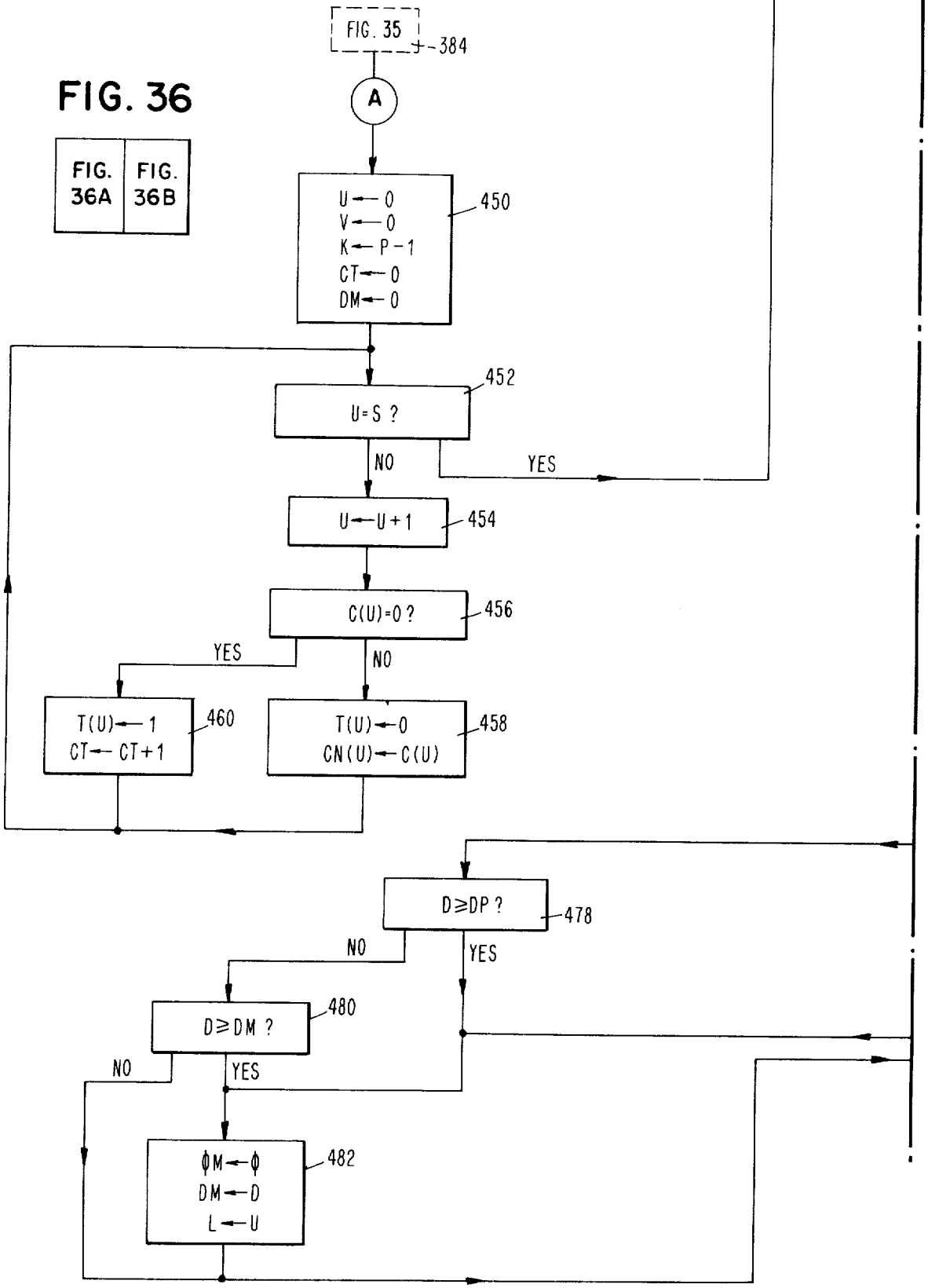
Figure 36B:
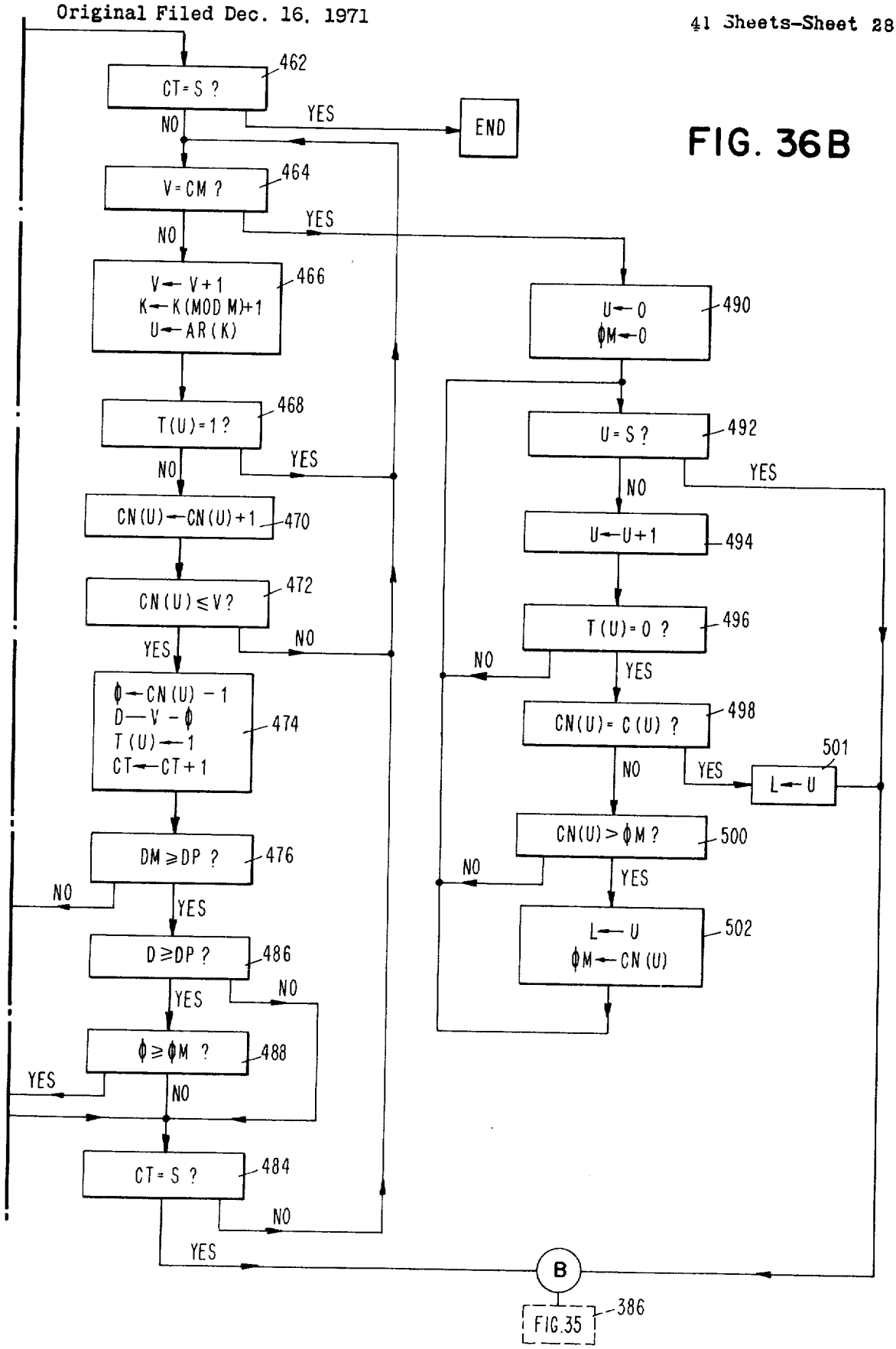
Figure 53:
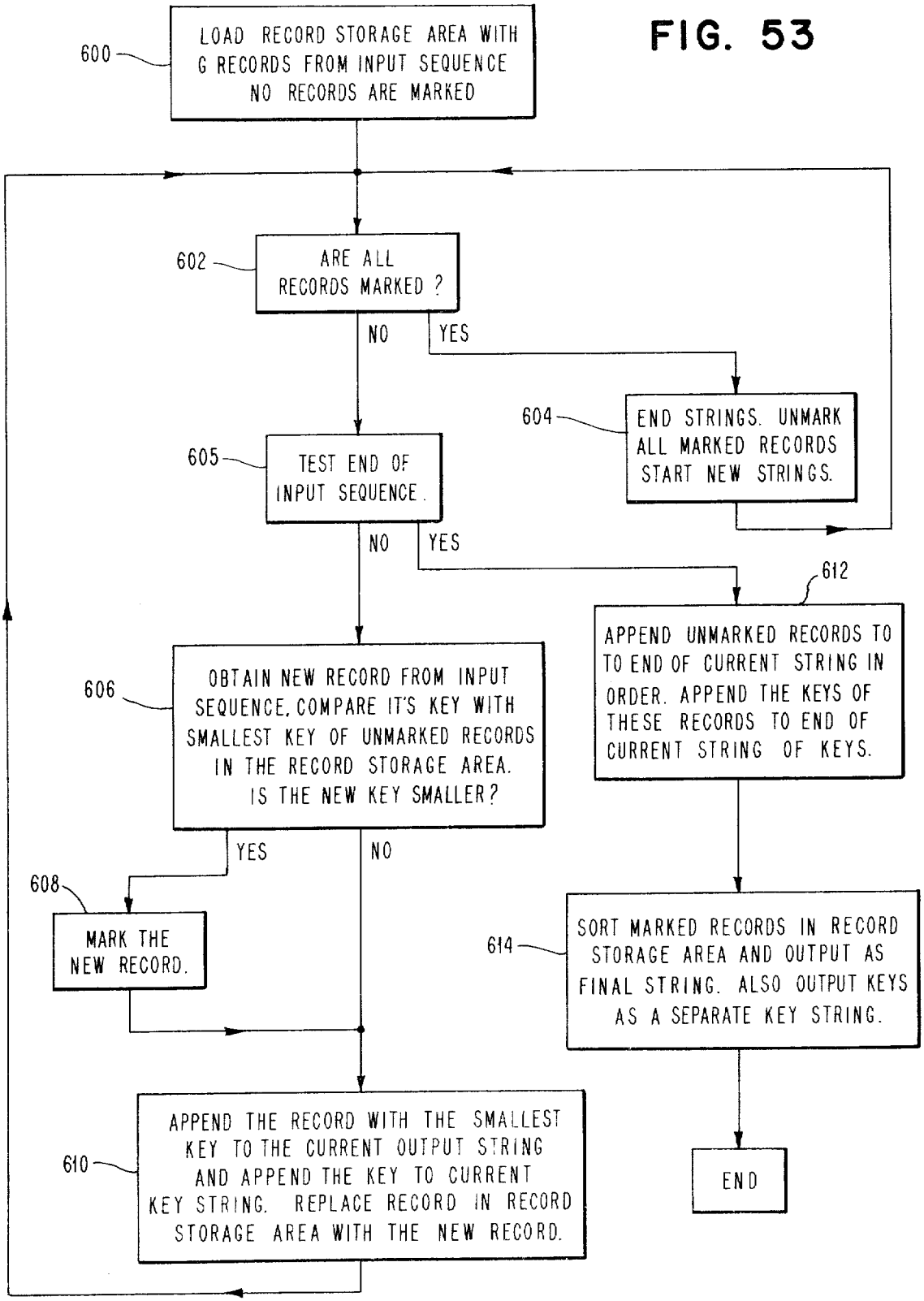
Figure 54:
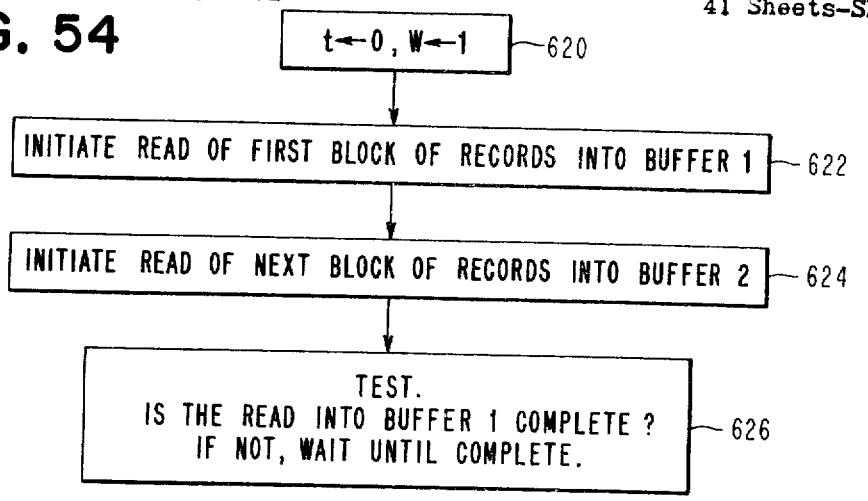
Figure 55:
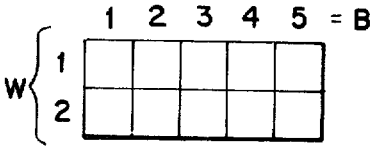
Figure 56:
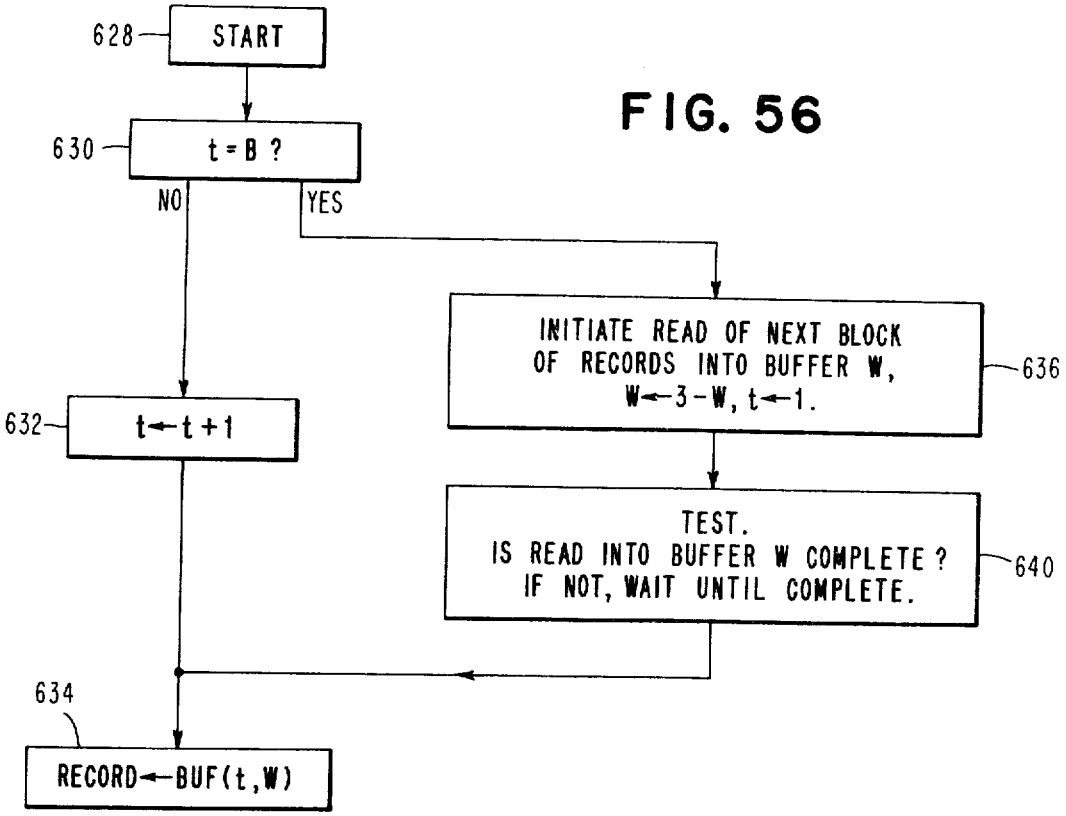
Figure 57A:
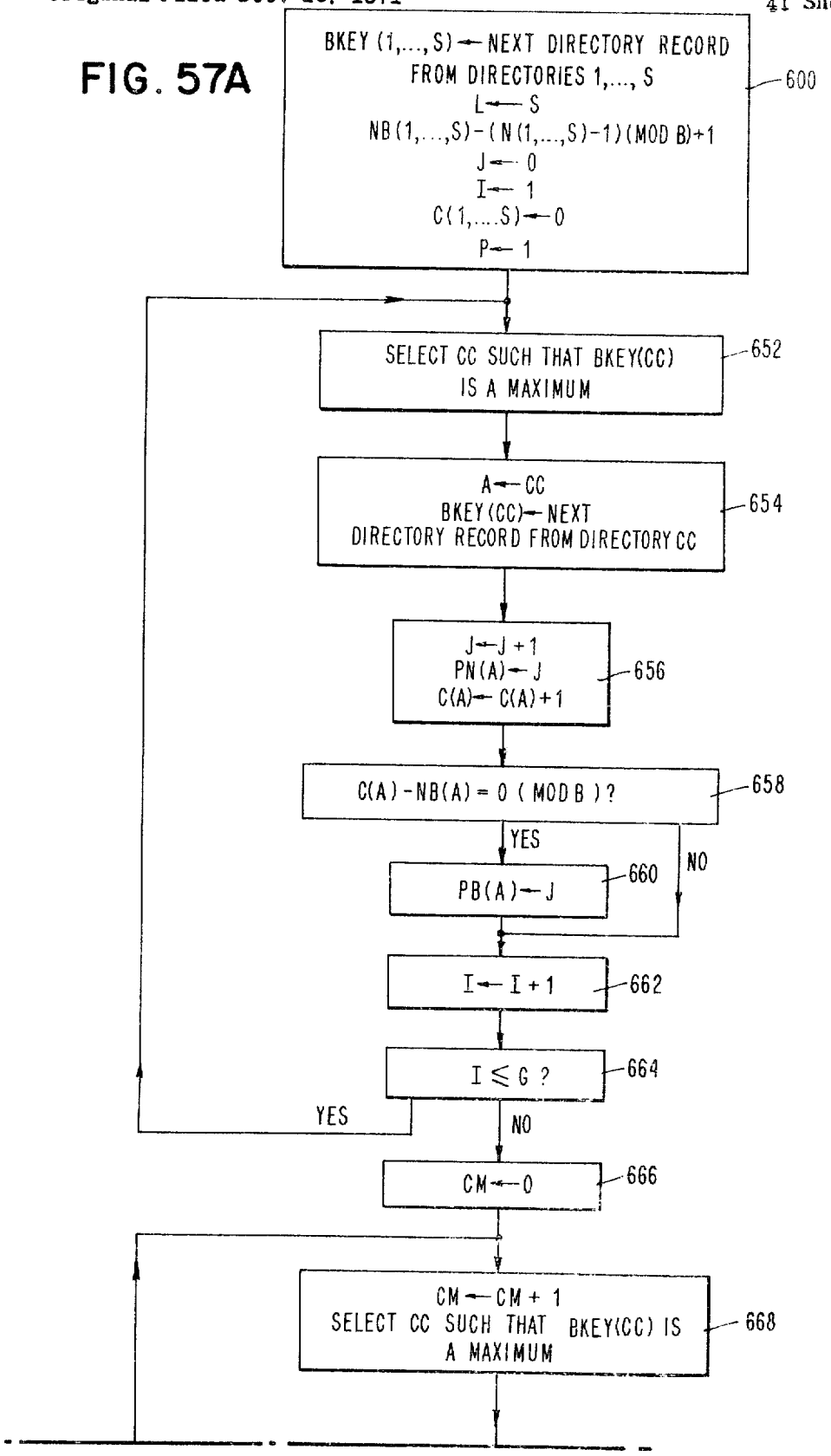
Figure 57:
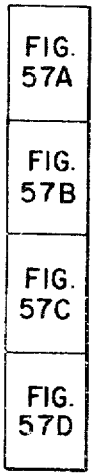
Figure 57B:
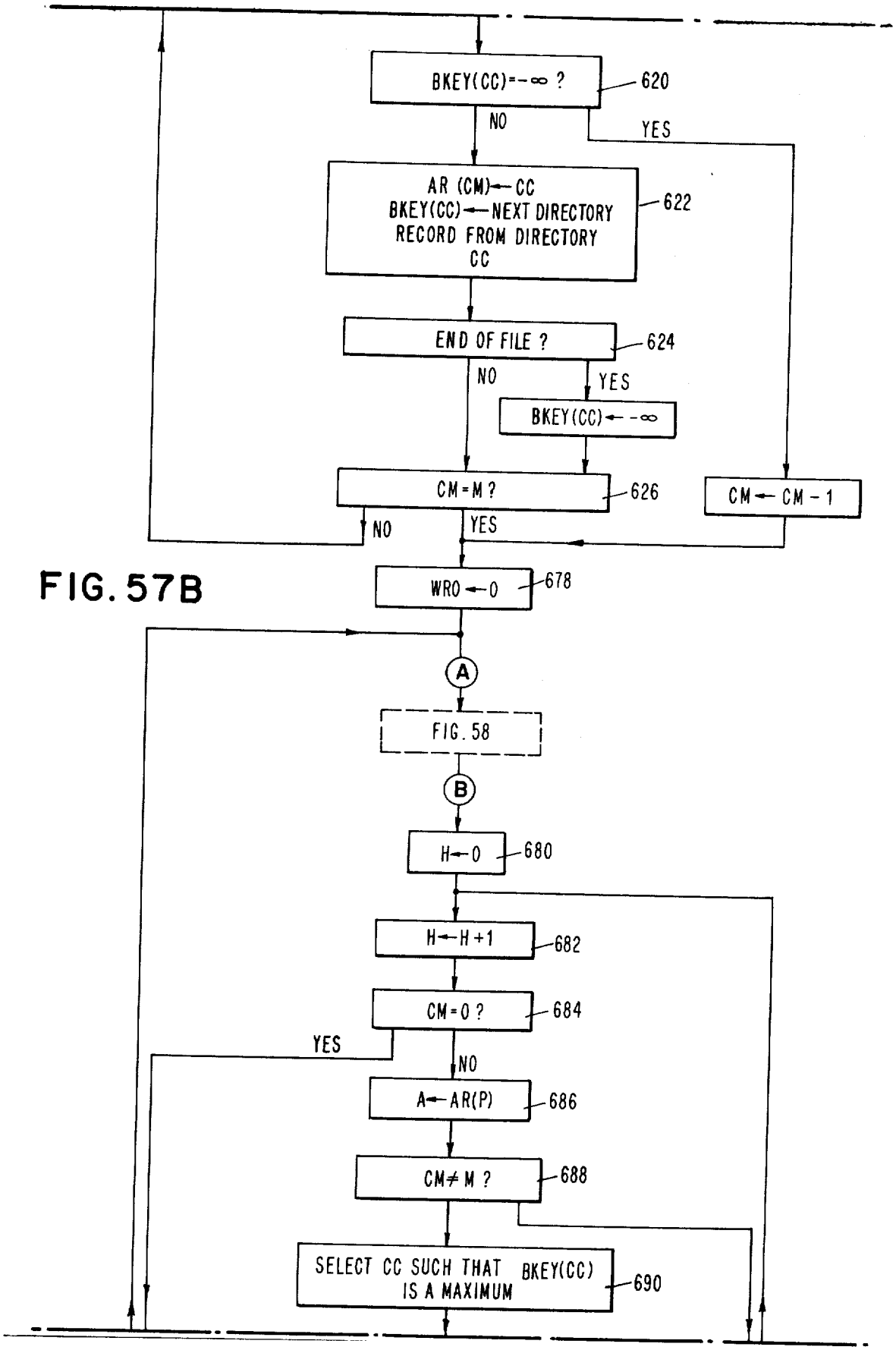
Figure 57C:
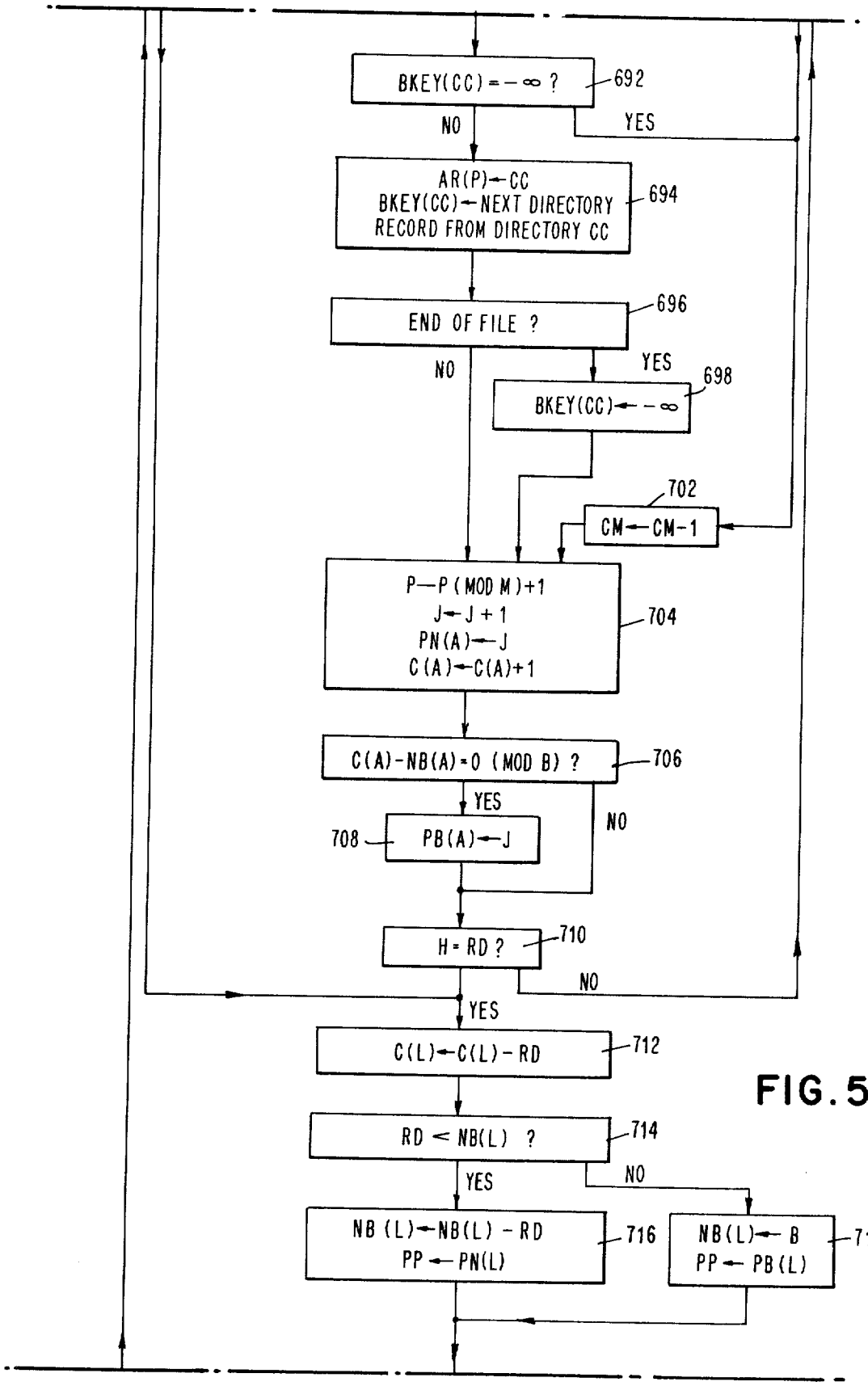
Figure 57D:
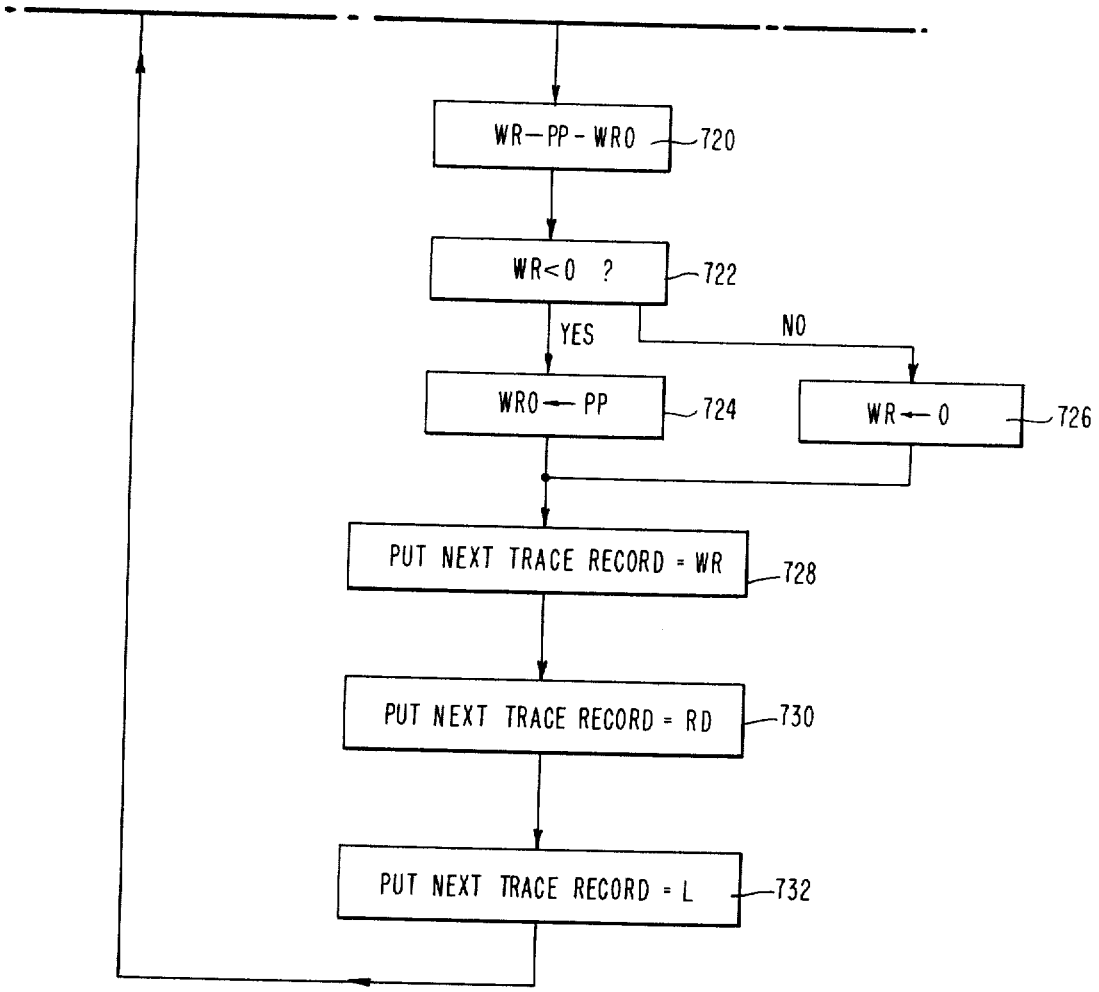
Figure 58:
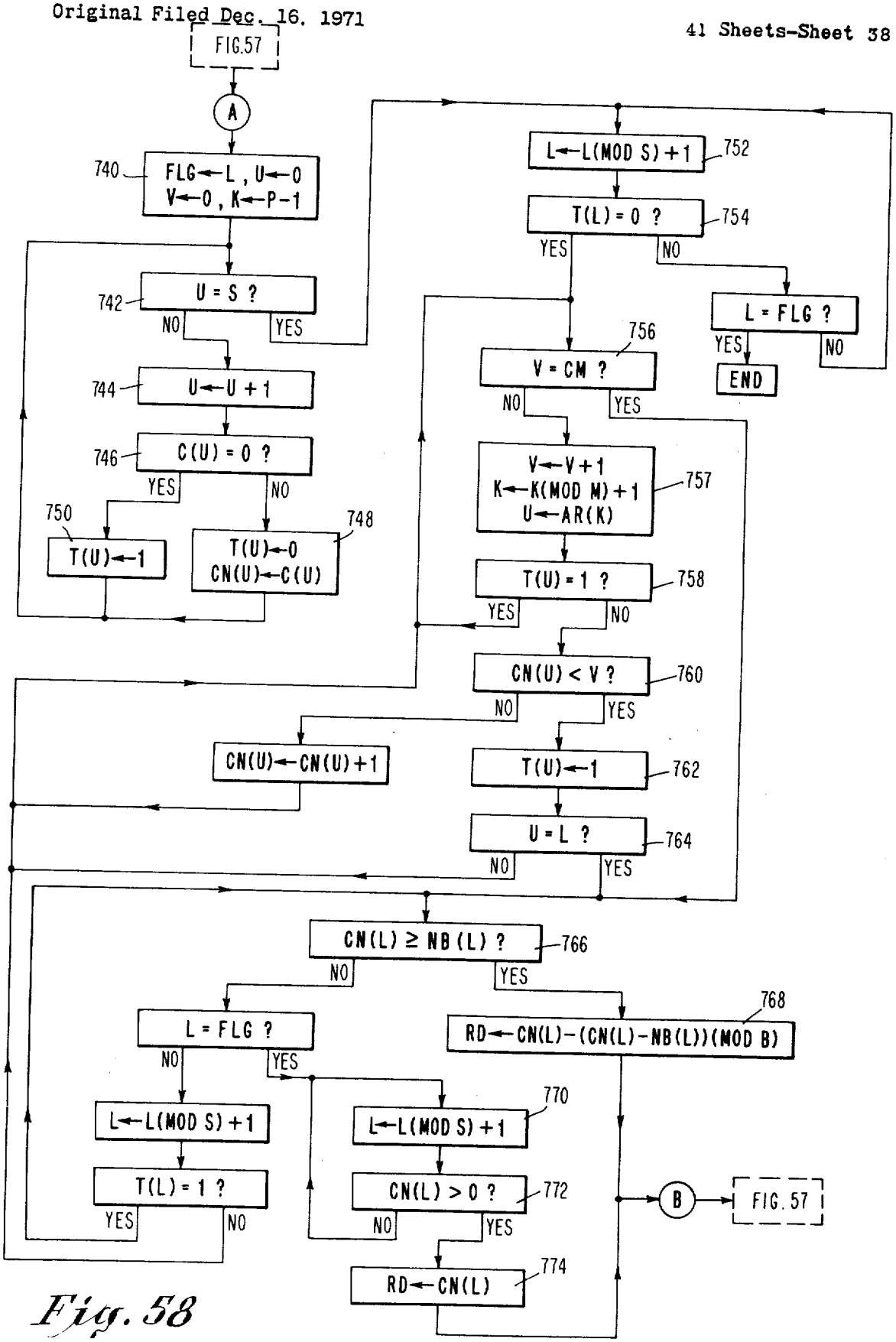
Figures 68A, 68B, 68C, 68D, 68E:
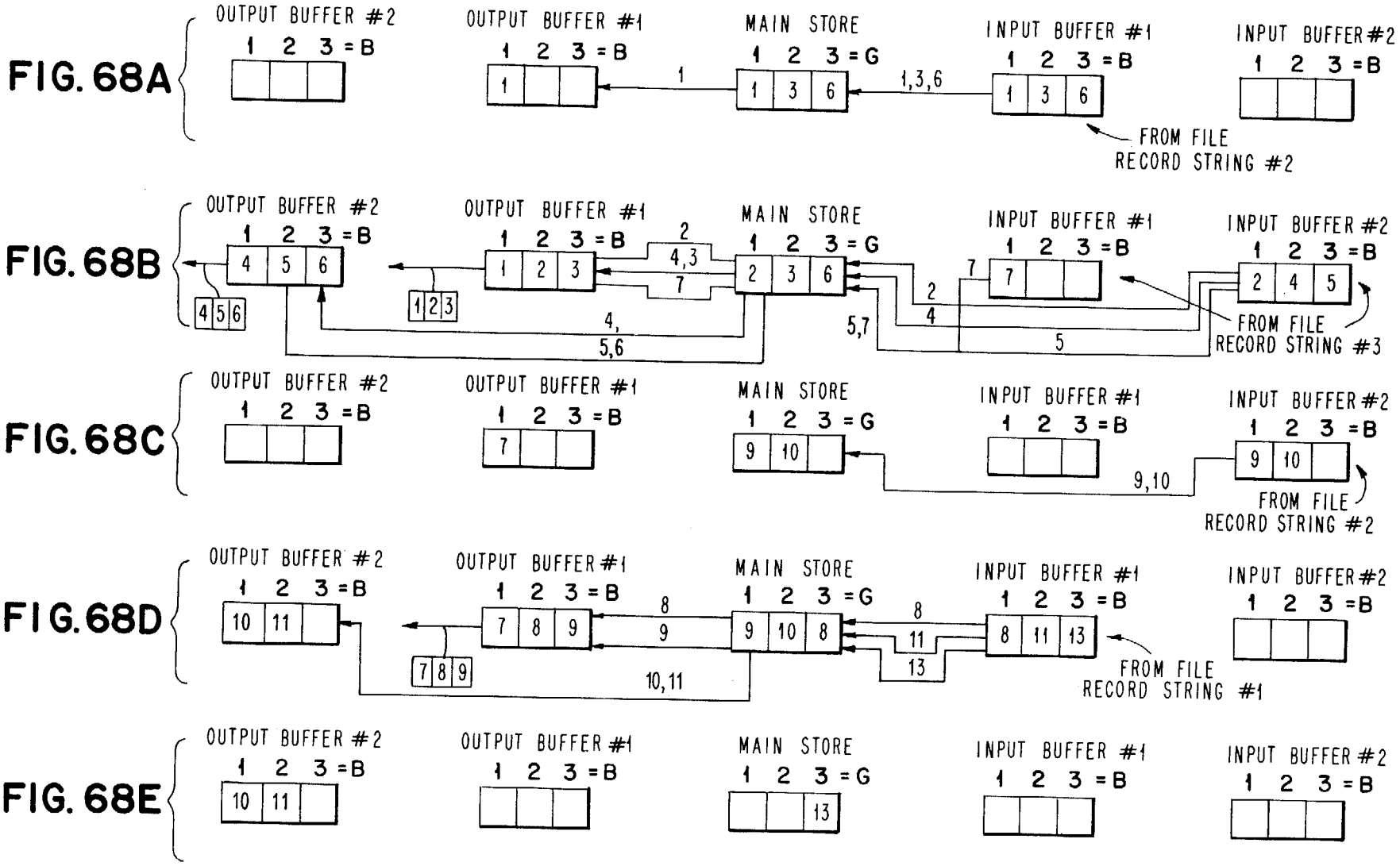

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 3, 1975

935 O.G. 11

T935,005

PROCESS FOR THE SEQUENTIAL RECOVERY OF THE RECORDS OF A FILE

Brian T. Bennett, Wenonah Trail, Mohegan Lake, N.Y. 10547, and Archie C. McKellar, 100 Diplomat Drive, Apt. 3C, Mount Kisco, N.Y. 10549

Continuation of application Ser. No. 208,547, Dec. 16, 1971. This application June 7, 1974, Ser. No. 477,373.

Int. Cl. G06f *7/06*

U.S. Cl. 340—172.5

41 Sheets Drawing. 6 Pages Specification

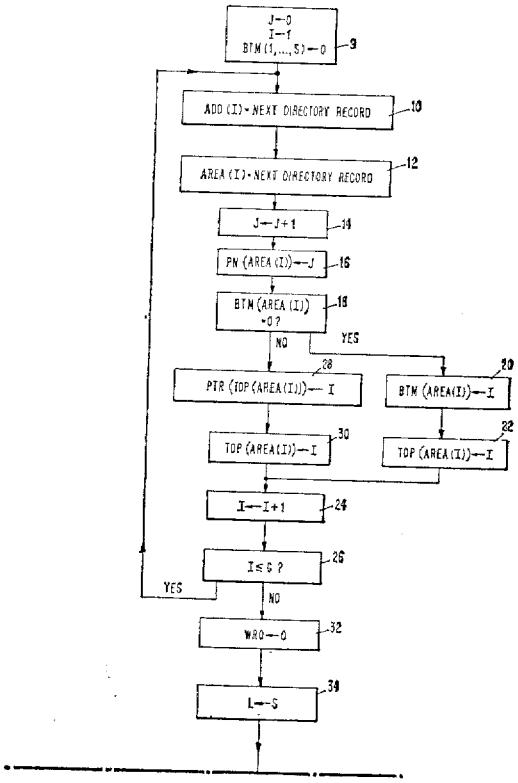

A process is disclosed for the sequential recovery of the records of a file wherein the records are randomly located on a storage device which comprises a plurality of areas. The process is based upon the principle that the recovery

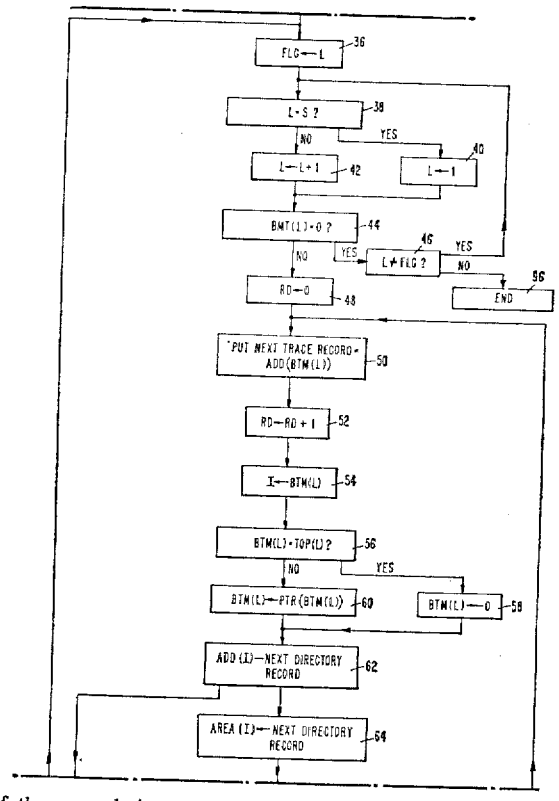

of the records in sequence order is isomorphic to the distribution of the sequence of records into the specific locations on the storage device. In the process, a directory is employed which contains the tags of the records in se-

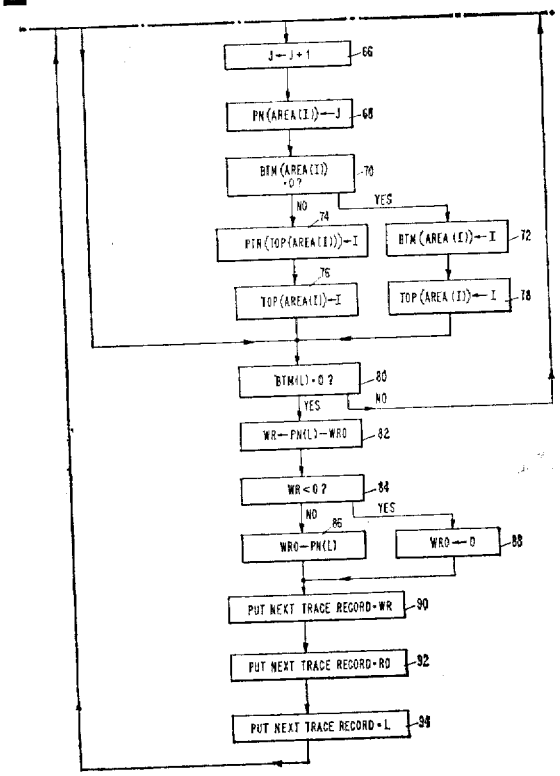

quential order of key value, the tag comprising the records key value, and its address in the storage device. Utilizing the directory, a simulation of the distribution of the tags therein is performed and the result of the simulated distribution is written out in the form of a string of items which includes portions of the tags grouped therein according to areas and information as to which records and how many are to be written out at respective visits to the storage device. The items in the string are then employed in the reverse order of their writing out to determine the recovery or retrieval of the records in sequential order of key value. In one aspect of the invention, the record recovery may be performed by scanning the areas of the storage device in a cyclic fashion. In another aspect, the record recovery may be achieved by selectively visiting chosen areas of the storage device, the determination of the selection of the area which may be visited at a particular juncture depending upon predetermined criteria such as quantity of records that can be written out at a visit, etc. The process can be accomplished either by a single or multi-pass operation. The process is a substantial improvement over other sequential record recovery processes which employ a tag sort and utilize the sorted tags to perform an ordered record retrieval by conventional methods. In another aspect of the invention, order substrings of the file are formed and these substrings then function as the areas in the execution of the process. Concurrently, with the formation of these strings, corresponding directories are created which can subsequently be merged.

PROCESS FOR THE SEQUENTIAL RECOVERY OF THE RECORDS OF A FILE

Original Filed Dec. 16, 1971 41 Sheets-Sheet 1

INVENTORS
BRIAN T. BENNETT
ARCHIE C. MC KELLAR
BY Isidore Match
ATTORNEY

FLG←L
36
L=S ?
38
NO
YES
L←L+1
42
L←1
40
BMT(L)=0 ?
44
NO
YES
L≠FLG ?
46
YES
NO
END
96
RD←0
48
PUT NEXT TRACE RECORD=
ADD(BTM(L))
50
RD←RD+1
52
I←BTM(L)
54
BTM(L)=TOP(L) ?
56
NO
YES
BTM(L)←PTR(BTM(L))
60
BTM(L)←0
58
ADD (I)—NEXT DIRECTORY
RECORD
62
AREA (I)←NEXT DIRECTORY
RECORD
64

PROCESS FOR THE SEQUENTIAL RECOVERY OF THE RECORDS OF A FILE

Original Filed Dec. 16, 1971 41 Sheets-Sheet 3

FIG. 2

AREAS

| ADDRESSES | 1 | 2 | 3 = S |
|---|---|---|---|
| 1 | 12 | 7 | 2 |
| 2 | 8 | 11 | 9 |
| 3 | 4 | 1 | 5 |
| 4 | 3 | 10 | 6 |

FIG. 3

| 1 | 2 | 3 | 4 | 5 | 6 | 7 | 8 | 9 | 10 | 11 | 12 = J |
|---|---|---|---|---|---|---|---|---|---|---|---|
| 1 1 | 2 2 | 4 2 | 2 3 | 2 1 | 1 2 | 4 3 | 3 3 | 3 1 | 4 1 | 1 3 | 3 2 |

FIG.4A

BTM(1)

| | 1 | 2 | 3 | 4 | 5 | 6 = G |
|---|---|---|---|---|---|---|
| ADDRESS | 1 | | | | | |
| AREA | 1 | | | | | |
| PTR | | | | | | |

TOP(1)

FIG.4B

BTM(1) BTM(2)

| | 1 | 2 | 3 | 4 | 5 | 6 = G |
|---|---|---|---|---|---|---|
| ADDRESS | 1 | 2 | | | | |
| AREA | 1 | 2 | | | | |
| PTR | | | | | | |

TOP(1) TOP(2)

FIG.4C

BTM(1) BTM(2)

| | 1 | 2 | 3 | 4 | 5 | 6 = G |
|---|---|---|---|---|---|---|
| ADDRESS | 1 | 2 | 4 | | | |
| AREA | 1 | 2 | 2 | | | |
| PTR | | 3 | | | | |

TOP(1) TOP(2)

FIG.4D

BTM(1) BTM(2) BTM(3)

| | 1 | 2 | 3 | 4 | 5 | 6 = G |
|---|---|---|---|---|---|---|
| ADDRESS | 1 | 2 | 4 | 2 | | |
| AREA | 1 | 2 | 2 | 3 | | |
| PTR | | 3 | | | | |

TOP(1) TOP(2) TOP(3)

FIG.4E

BTM(1) BTM(2) BTM(3)

| | 1 | 2 | 3 | 4 | 5 | 6 = G |
|---|---|---|---|---|---|---|
| ADDRESS | 1 | 2 | 4 | 2 | 2 | |
| AREA | 1 | 2 | 2 | 3 | 1 | |
| PTR | 5 | 3 | | | | |

TOP(2) TOP(3) TOP(1)

FIG. 4F

BTM(1) BTM(2) BTM(3)

| | 1 | 2 | 3 | 4 | 5 | 6 = G |
|---|---|---|---|---|---|---|
| ADDRESS | 1 | 2 | 4 | 2 | 2 | 1 |
| AREA | 1 | 2 | 2 | 3 | 1 | 2 |
| PTR | 5 | 3 | 6 | | | |

TOP(3) TOP(1) TOP(2)

FIG. 4G

BTM(2) BTM(3) BTM(1)

| | 1 | 2 | 3 | 4 | 5 | 6 = G |
|---|---|---|---|---|---|---|
| ADDRESS | 4 | 2 | 4 | 2 | 2 | 1 |
| AREA | 3 | 2 | 2 | 3 | 1 | 2 |
| PTR | | 3 | 6 | 1 | | |

TOP(3) TOP(1) TOP(2)

FIG. 4H

BTM(2) BTM(3)

| | 1 | 2 | 3 | 4 | 5 | 6 = G |
|---|---|---|---|---|---|---|
| ADDRESS | 4 | 2 | 4 | 2 | 3 | 1 |
| AREA | 3 | 2 | 2 | 3 | 3 | 2 |
| PTR | 5 | 3 | 6 | 1 | | |

TOP(3) TOP(2)

PROCESS FOR THE SEQUENTIAL RECOVERY OF THE RECORDS OF A FILE

Original Filed Dec. 16, 1971

FIG. 5A

J 0

FIG. 5B

J 1

FIG. 5C

J 2

FIG. 5D

J 3

FIG. 5E

J 4

FIG. 5F

J 5

FIG. 5G

J 6

FIG. 5H

J 7

FIG. 5I

J 8

FIG. 5J

J 9

FIG. 5K

J 10

FIG. 5L

J 11

J 12 FIG. 5M

| | 1 | 2 | 3 = S |
|---|---|---|---|
| PN | 1 | | |

FIG. 6A

| | 1 | 2 | 3 = S |
|---|---|---|---|
| PN | 1 | 2 | |

FIG. 6B

| | 1 | 2 | 3 = S |
|---|---|---|---|
| PN | 1 | 3 | |

FIG. 6C

| | 1 | 2 | 3 = S |
|---|---|---|---|
| PN | 1 | 3 | 4 |

FIG. 6D

| | 1 | 2 | 3 = S |
|---|---|---|---|
| PN | 5 | 3 | 4 |

FIG. 6E

| | 1 | 2 | 3 = S |
|---|---|---|---|
| PN | 5 | 6 | 4 |

FIG. 6F

| | 1 | 2 | 3 = S |
|---|---|---|---|
| PN | 5 | 6 | 7 |

FIG. 6G

| | 1 | 2 | 3 = S |
|---|---|---|---|
| PN | 5 | 6 | 8 |

FIG. 6H

| | 1 | 2 | 3 = S |
|---|---|---|---|
| PN | 9 | 6 | 8 |

FIG. 6I

| | 1 | 2 | 3 = S |
|---|---|---|---|
| PN | 10 | 6 | 8 |

FIG. 6J

| | 1 | 2 | 3 = S |
|---|---|---|---|
| PN | 10 | 6 | 11 |

FIG. 6K

| | 1 | 2 | 3 = S |
|---|---|---|---|
| PN | 10 | 12 | 11 |

FIG. 6L

I 1

FIG. 7A

I 2

FIG. 7B

I 3

FIG. 7C

I 4

FIG. 7D

FIG. 7E

| I | 5 |
|---|---|

FIG. 7F

| I | 6 |
|---|---|

FIG. 7G

| I | 7 |
|---|---|

| | 1 | 2 | 3 = S |
|---|---|---|---|
| BTM | 1 | 2 | 4 |
| TOP | 5 | 6 | 4 |

FIG. 8A

| | 1 | 2 | 3 = S |
|---|---|---|---|
| BTM | 5 | 2 | 4 |
| TOP | 5 | 6 | 4 |

FIG. 8B

| | 1 | 2 | 3 = S |
|---|---|---|---|
| BTM | 0 | 2 | 4 |
| TOP | 5 | 6 | 5 |

FIG. 8C

| | 1 | 2 | 3 = S |
|---|---|---|---|
| BTM | 0 | 3 | 4 |
| TOP | 5 | 6 | 5 |

FIG. 8D

| | 1 | 2 | 3 = S |
|---|---|---|---|
| BTM | 2 | 3 | 4 |
| TOP | 2 | 6 | 5 |

FIG. 8E

| | 1 | 2 | 3 = S |
|---|---|---|---|
| BTM | 2 | 6 | 4 |
| TOP | 2 | 6 | 5 |

FIG. 8F

| | 1 | 2 | 3 = S |
|---|---|---|---|
| BTM | 2 | 6 | 4 |
| TOP | 3 | 6 | 5 |

FIG. 8G

| | 1 | 2 | 3 = S |
|---|---|---|---|
| BTM | 2 | 0 | 4 |
| TOP | 3 | 6 | 6 |

FIG. 8H

| | 1 | 2 | 3 = S |
|---|---|---|---|
| BTM | 2 | 0 | 1 |
| TOP | 3 | 6 | 6 |

FIG. 8I

| | 1 | 2 | 3 = S |
|---|---|---|---|
| BTM | 2 | 4 | 5 |
| TOP | 3 | 4 | 6 |

FIG. 8J

| | 1 | 2 | 3 = S |
|---|---|---|---|
| BTM | 2 | 4 | 6 |
| TOP | 3 | 4 | 6 |

FIG. 8K

| | 1 | 2 | 3 = S |
|---|---|---|---|
| BTM | 2 | 4 | 0 |
| TOP | 3 | 4 | 6 |

FIG. 8L

| | 1 | 2 | 3 = S |
|---|---|---|---|
| BTM | 3 | 4 | 0 |
| TOP | 3 | 4 | 6 |

FIG. 8M

| | 1 | 2 | 3 = S |
|---|---|---|---|
| BTM | 0 | 4 | 0 |
| TOP | 3 | 4 | 6 |

FIG. 8N

| | 1 | 2 | 3 = S |
|---|---|---|---|
| BTM | 0 | 0 | 0 |
| TOP | 3 | 4 | 6 |

FIG. 8O

FIG. 9A
WRO 0

FIG. 9B
WRO 5

FIG. 9C
WRO 6

FIG. 9D
WRO 11

FIG. 10A
L 3

FIG. 10B
L 1

FIG. 10C
L 2

FIG. 10D
L 3

FIG. 10E
L 1

FIG. 10F
L 2

FIG. 10G
L 3

FIG. 11A
FLG 3

FIG. 11B
FLG 1

FIG. 11C
FLG 2

FIG. 11D
FLG 3

FIG. 11E
FLG 1

FIG. 11F
FLG 2

FIG. 12A
RD 0

FIG. 12B
RD 1

FIG. 12C
RD 2

FIG. 12D
RD 0

FIG. 12E
RD 1

FIG. 12F
RD 2

FIG. 12G
RD 3

FIG. 12H
RD 0

FIG. 12I
RD 1

FIG. 12J
RD 2

FIG. 12K
RD 3

FIG. 12L
RD 4

FIG. 12M
RD 0

FIG. 12N
RD 0

FIG. 12O
RD 1

FIG. 13A

I [1]

FIG. 13B

I [5]

FIG. 13C

I [2]

FIG. 13D

I [3]

FIG. 13E

I [6]

FIG. 13F

I [4]

FIG. 13G

I [1]

FIG. 13H

I [5]

FIG. 13I

I [6]

FIG. 13J

I [2]

FIG. 13K

I [3]

FIG. 14A

WR [5]

FIG. 14B

WR [1]

FIG. 14C

WR [5]

FIG. 14D

WR [0]

FIG. 14E

WR [1]

FIG. 15

1
2
5 (WR)
2 (RD)
1 (L)
2
4
1
1 (WR)
3 (RD)
2 (L)
2
4
3
1
5 (WR)
4 (RD)
3 (L)
3
4
0 (WR)
2 (RD)
1 (L)
3
1 (WR)
1 (RD)
2 (L)

PROCESS FOR THE SEQUENTIAL RECOVERY OF THE RECORDS OF A FILE

Original Filed Dec. 16, 1971 41 Sheets-Sheet 12

FIG. 17A

| | 1 | 2 | 3 | 4 | 5 | 6 = G |
|---|---|---|---|---|---|---|
| REC | | | | | | 1 |
| PT | 0 | 1 | 2 | 3 | 4 | 5 |

FIG. 17B

| | 1 | 2 | 3 | 4 | 5 | 6 = G |
|---|---|---|---|---|---|---|
| REC | | | | | 4 | 3 |
| PT | 0 | 1 | 2 | 3 | 0 | 5 |
| | | | | F | PP | S |

FIG. 17C

| | 1 | 2 | 3 | 4 | 5 | 6 = G |
|---|---|---|---|---|---|---|
| REC | | | | 2 | 4 | 3 |
| PT | 0 | 1 | 2 | 6 | 0 | 5 |
| | | | F | S PP | | P |

FIG. 17D

| | 1 | 2 | 3 | 4 | 5 | 6 = G |
|---|---|---|---|---|---|---|
| REC | | | 5 | 2 | 4 | 3 |
| PT | 0 | 1 | 0 | 6 | 3 | 5 |
| | | F | PP | S | | |

| | 1 | 2 | 3 | 4 | 5 | 6 = G |
|---|---|---|---|---|---|---|
| REC | 9 | 6 | 5 | 2 | 4 | 3 |
| PT | 0 | 1 | 2 | 6 | 3 | 5 |
| | PP | | | S | | |

FIG. 17E

FIG. 18A F 6

FIG. 18B F 5

FIG. 18C F 6

FIG. 18D F 5

FIG. 18E F 4

FIG. 18F F 3

FIG. 18G F 2

FIG. 18H F 1

FIG. 18I F 0

FIG. 18J F 4

FIG. 18K F 6

FIG. 18L F 5

FIG. 18M F 3

FIG. 18N F 2

FIG. 19A S 0

FIG. 19B S 6

FIG. 19C S 0

FIG. 19D S 6

FIG. 19E S 4

FIG. 19F S 6

FIG. 19G S 5

FIG. 19H S 3

FIG. 19I S 2

FIG. 19J S 1

PROCESS FOR THE SEQUENTIAL RECOVERY OF THE RECORDS OF A FILE

Original Filed Dec. 16, 1971

FIG. 20A
P 0

FIG. 21A
PP 0

FIG. 21J
PP 3

FIG. 22A
L 2

FIG. 23A
RD 1

FIG. 20B
P 0

FIG. 21B
PP 6

FIG. 21K
PP 2

FIG. 22B
L 1

FIG. 23B
RD 2

FIG. 20C
P 6

FIG. 21C
PP 0

FIG. 21L
PP 1

FIG. 22C
L 3

FIG. 23C
RD 4

FIG. 20D
P 5

FIG. 21D
PP 6

FIG. 20E
P 0

FIG. 21E
PP 5

FIG. 21F
PP 0

FIG. 24A
WR 1

FIG. 21G
PP 4

FIG. 24B
WR 0

FIG. 21H
PP 6

FIG. 24C
WR 5

FIG. 21I
PP 5

FIG. 25A

IC 0

FIG. 25B

IC 1

FIG. 25C

IC 0

FIG. 25D

IC 1

FIG. 25E

IC 2

FIG. 25F

IC 0

FIG. 25G

IC 1

FIG. 25H

IC 2

FIG. 25I

IC 3

FIG. 25J

IC 4

FIG. 26A

OC 0

FIG. 26B

OC 1

FIG. 26C

OC 0

FIG. 26D

OC 0

FIG. 26E

OC 1

FIG. 26F

OC 2

FIG. 26G

OC 3

FIG. 26H

OC 4

FIG. 26I

OC 5

FIG. 27A

ADDR 3

FIG. 27B

ADDR 4

FIG. 27C

ADDR 3

FIG. 27D

ADDR 1

FIG. 27E

ADDR 3

FIG. 27F

ADDR 4

FIG. 27G

ADDR 2

FIG. 28A

I [6]

FIG. 28B

I [6]

FIG. 28C

I [5]

FIG. 28D

I [4]

FIG. 28E

I [3]

FIG. 28F

I [2]

FIG. 28G

I [1]

FIG. 29A

X [0]

FIG. 29B

X [6]

FIG. 29C

X [5]

FIG. 29D

X [3]

FIG. 29E

X [2]

FIG. 29F

X [1]

FIG. 30

| |
|---|
| 1 |
| 2 |
| 3 |
| 4 |
| 5 |
| 6 |

| | 1 | 2 | 3 |
|---|---|---|---|
| B KEY | | | |
| B ADD | | | |

FIG. 33

| | 1 | 2 |
|---|---|---|
| B KEY | | |
| B ADD | | |

FIG. 34

PROCESS FOR THE SEQUENTIAL RECOVERY OF THE RECORDS OF A FILE

Original Filed Dec. 16, 1971 41 Sheets-Sheet 17

| |
|---|
| FIG. 35A |
| FIG. 35B |
| FIG. 35C |
| FIG. 35D |

PROCESS FOR THE SEQUENTIAL RECOVERY OF THE RECORDS OF A FILE

Original Filed Dec. 16, 1971 41 Sheets-Sheet 24

| FIG. 36A | FIG. 36B |
|---|---|

PROCESS FOR THE SEQUENTIAL RECOVERY OF THE RECORDS OF A FILE

Original Filed Dec. 16, 1971 41 Sheets-Sheet 28

FIG. 37A

| | 1 | 2 | 3 | 4 | 5 | 6 = G |
|---|---|---|---|---|---|---|
| ADD | 1 | 2 | 4 | 2 | 2 | 1 |
| AREA | 1 | 2 | 2 | 3 | 1 | 2 |

FIG. 37B

| | 1 | 2 | 3 | 4 | 5 | 6 = G |
|---|---|---|---|---|---|---|
| ADD | 1 | 4 | 4 | 2 | 2 | 1 |
| AREA | 1 | 3 | 2 | 3 | 1 | 2 |

FIG. 37C

| | 1 | 2 | 3 | 4 | 5 | 6 = G |
|---|---|---|---|---|---|---|
| ADD | 1 | 4 | 3 | 2 | 2 | 3 |
| AREA | 1 | 3 | 3 | 3 | 1 | 1 |

FIG. 38A

| | 1 | 2 | 3 = S |
|---|---|---|---|
| C | 2 | 3 | 1 |

FIG. 38B

| | 1 | 2 | 3 = S |
|---|---|---|---|
| C | 3 | 0 | 3 |

FIG. 39A

| | 1 | 2 | 3 | 4 | 5 | 6 = M |
|---|---|---|---|---|---|---|
| ADD | 4 | 3 | 3 | 4 | 1 | 3 |
| AREA | 3 | 3 | 1 | 1 | 3 | 2 |

P

FIG. 39B

| | 1 | 2 | 3 | 4 | 5 | 6 = M |
|---|---|---|---|---|---|---|
| ADD | | 3 | 3 | 4 | 1 | 3 |
| AREA | | 3 | 1 | 1 | 3 | 2 |

P

FIG. 39C

| | 1 | 2 | 3 | 4 | 5 | 6 = M |
|---|---|---|---|---|---|---|
| ADD | | | | 4 | 1 | 3 |
| AREA | | | | 1 | 3 | 2 |

P

FIG. 40A

CM 6

FIG. 40B

CM 3

FIG. 41A

| | 1 | 2 | 3 |
|---|---|---|---|
| CN | 2 | 3 | 1 |

FIG. 42A

| | 1 | 2 | 3 |
|---|---|---|---|
| T | 0 | 0 | 0 |

FIG. 43A

V 3

FIG. 41B

| | 1 | 2 | 3 |
|---|---|---|---|
| CN | 3 | 3 | 3 |

FIG. 42B

| | 1 | 2 | 3 |
|---|---|---|---|
| T | 1 | 0 | 0 |

FIG. 43B

V 5

FIG. 41C

| | 1 | 2 | 3 |
|---|---|---|---|
| CN | 4 | 3 | 4 |

FIG. 42C

| | 1 | 2 | 3 |
|---|---|---|---|
| T | 1 | 0 | 1 |

FIG. 43C

V 6

FIG. 41D

| | 1 | 2 | 3 |
|---|---|---|---|
| CN | 4 | 4 | 4 |

FIG. 42D

| | 1 | 2 | 3 |
|---|---|---|---|
| T | 1 | 1 | 1 |

FIG. 44A

K 3

FIG. 45A

U 1

FIG. 46A $\phi$ 2

FIG. 44B

K 5

FIG. 45B

U 3

FIG. 46B $\phi$ 3

FIG. 44C

K 6

FIG. 45C

U 2

FIG. 46C $\phi$ 3

FIG. 47A

D 1

FIG. 47B

D 2

FIG. 47C

D 3

FIG. 48A

CT 1

FIG. 48B

CT 2

FIG. 48C

CT 3

FIG. 49A

DM 1

FIG. 49B

DM 2

FIG. 49C

DM 3

FIG. 50A

ϕM 2

FIG. 50B

ϕM 3

FIG. 50C

ϕM 3

FIG. 51A

L 1

FIG. 51B

L 3

FIG. 51C

L 2

FIG. 52

2
4
1
6 (WR)
3 (RD)
2 (L)
1
2
3
4
4 (WR)
4 (R)
1 (L)
2
4
3
1
1 (WR)
4 (RD)
3 (L)
3
1 (WR)
1 (RD)
2 (L)

PROCESS FOR THE SEQUENTIAL RECOVERY OF THE RECORDS OF A FILE

Original Filed Dec. 16, 1971 41 Sheets-Sheet 38

FIG. 59A

| | | | | | | | | | | |
|---|---|---|---|---|---|---|---|---|---|---|
| 1 | 33 | 32 | 26 | 25 | 21 | 17 | 14 | 13 | 11 | 8 |

FIG. 59B

| | | | | | | | | | | | | |
|---|---|---|---|---|---|---|---|---|---|---|---|---|
| 2 | 31 | 28 | 27 | 22 | 19 | 16 | 15 | 10 | 9 | 6 | 3 | 1 |

FIG. 59C

| | | | | | | | | | | | |
|---|---|---|---|---|---|---|---|---|---|---|---|
| 3 | 30 | 29 | 24 | 23 | 20 | 18 | 12 | 7 | 5 | 4 | 2 |

FIG. 60A

| | 1 | 2 | 3 =S |
|---|---|---|---|
| BKEY | 33 | 31 | 30 |

FIG. 61A

| | 1 | 2 | 3 =S |
|---|---|---|---|
| NB | 1 | 3 | 2 |

FIG. 60B

| | 1 | 2 | 3 =S |
|---|---|---|---|
| BKEY | 26 | 27 | 24 |

FIG. 61B

| | 1 | 2 | 3 =S |
|---|---|---|---|
| NB | 3 | 3 | 2 |

FIG. 62A

| | |
|---|---|
| J | 3 |

FIG. 63A

| | 1 | 2 | 3 =S |
|---|---|---|---|
| C | 2 | 1 | 0 |

FIG. 62B

| | |
|---|---|
| J | 4 |

FIG. 63B

| | 1 | 2 | 3 =S |
|---|---|---|---|
| C | 1 | 1 | 1 |

FIG. 64A

| | 1 | 2 | 3 = M |
|---|---|---|---|
| AR | 3 | 3 | 2 |

FIG. 64B

| | 1 | 2 | 3 = M |
|---|---|---|---|
| AR | 2 | 3 | 2 |

FIG. 65A

| | 1 | 2 | 3 = S |
|---|---|---|---|
| T | 0 | 0 | 1 |

FIG. 65B

| | 1 | 2 | 3 = S |
|---|---|---|---|
| T | 0 | 1 | 1 |

FIG. 66

| | 1 | 2 | 3 = S |
|---|---|---|---|
| CN | 2 | 1 | 0 |

FIG. 67

| PASSES | | |
|---|---|---|
| 1 | 1 | WR |
| | 1 | RD |
| | 1 | L |
| 2 | 4 | WR |
| | 2 | RD |
| | 3 | L |
| 3 | 2 | WR |
| | 3 | RD |
| | 2 | L |
| 4 | 2 | WR |
| | 3 | RD |
| | 1 | L |
| 5 | 5 | WR |
| | 3 | RD |
| | 3 | L |
| 6 | 0 | WR |
| | 1 | RD |
| | 1 | L |
| 7 | 4 | WR |
| | 3 | RD |
| | 2 | L |
| 8 | 2 | WR |
| | 2 | RD |
| | 1 | L |
| 9 | 0 | WR |
| | 1 | RD |
| | 2 | L |
| 10 | 2 | WR |
| | 2 | RD |
| | 3 | L |
| 11 | 2 | WR |
| | 3 | RD |
| | 1 | L |
| 12 | 0 | WR |
| | 2 | RD |
| | 2 | L |
| 13 | 6 | WR |
| | 4 | RD |
| | 3 | L |
| 14 | 1 | WR |
| | 3 | RD |
| | 2 | L |

PROCESS FOR THE SEQUENTIAL RECOVERY OF THE RECORDS OF A FILE

Original Filed Dec. 16, 1971 41 Sheets-Sheet 41

ERRATA

In the notices of Defensive Publications appearing on pages 9–12 in the Official Gazette of June 3, 1975, the names of the assignees were omitted and should be added as indicated below:

T935,001. E. I. du Pont de Nemours and Company, Wilmington, Del.
T935,002. Pacific Lighting Service Co., Los Angeles, Calif.
T935,003. International Business Machines Corporation, Armonk, N.Y.
T935,004. International Business Machines Corporation, Armonk, N.Y.
T935,005. International Business Machines Corporation, Armonk, N.Y.
T935,006. E. I. du Pont de Nemours and Company, Wilmington, Del.

In the notices of Defensive Publications appearing on pages 7 and 8 in the Official Gazette of July 1, 1975, the following names of assignees were omitted and should be added:

T936,001. E. I. du Pont de Nemours and Company, Wilmington, Del.
T936,002. E. I. du Pont de Nemours and Company, Wilmington, Del.
T936,005. Du Pont of Canada Limited, Quebec, Canada